US012579945B2

(12) United States Patent
Feng et al.

(10) Patent No.: US 12,579,945 B2
(45) Date of Patent: Mar. 17, 2026

(54) SHIFT REGISTER, GATE DRIVER CIRCUIT AND DISPLAY DEVICE

(71) Applicants: Hefei BOE Joint Technology Co., Ltd., Anhui (CN); BOE TECHNOLOGY GROUP CO., LTD., Beijing (CN); BEIJING BOE TECHNOLOGY DEVELOPMENT CO., LTD., Beijing (CN)

(72) Inventors: Xuehuan Feng, Beijing (CN); Yongqian Li, Beijing (CN)

(73) Assignees: Hefei BOE Joint Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/845,241

(22) PCT Filed: Oct. 16, 2023

(86) PCT No.: PCT/CN2023/124824
§ 371 (c)(1),
(2) Date: Sep. 9, 2024

(87) PCT Pub. No.: WO2025/081319
PCT Pub. Date: Apr. 24, 2025

(65) Prior Publication Data
US 2026/0024498 A1 Jan. 22, 2026

(51) Int. Cl.
*G09G 3/3266* (2016.01)

(52) U.S. Cl.
CPC ... *G09G 3/3266* (2013.01); *G09G 2310/0286* (2013.01); *G09G 2310/061* (2013.01)

(58) Field of Classification Search
CPC ... G09G 2310/0286; G09G 2310/0267; G09G 2310/08; G09G 2310/0218; G09G 2310/0281; G09G 2310/0283; G09G 2310/061; G09G 2310/066; G09G 2310/0264; G09G 2300/0408; G09G 2300/0819; G09G 2300/0426; G09G 2300/08; G09G 3/3266; G09G 3/20;
(Continued)

(56) References Cited

U.S. PATENT DOCUMENTS

2018/0336957 A1* 11/2018 Mi .......................... G09G 3/20
2021/0065630 A1* 3/2021 Feng ...................... G11C 19/28
(Continued)

*Primary Examiner* — Dong Hui Liang
(74) *Attorney, Agent, or Firm* — The Webb Law Firm

(57) ABSTRACT

A shift register, includes a shift register unit and a first detection circuit electrically connected to the shift register unit. The shift register unit includes an input sub-circuit and an output sub-circuit. The input sub-circuit is configured to transmit a signal of an input signal terminal to a pull-up node under control of an input control terminal. The output sub-circuit is configured to receive a clock signal from a clock signal terminal, and provide an output signal to an output signal terminal based on the clock signal under control of a voltage at the pull-up node. The first detection circuit is electrically connected to the pull-up node and the clock signal terminal, and is configured to obtain a voltage difference at the pull-up node within a first interval time, and perform compensation on a voltage of the clock signal based on the voltage difference at the pull-up node.

20 Claims, 12 Drawing Sheets

(58) Field of Classification Search
CPC .. G09G 3/3677; G09G 3/3696; G09G 3/2092; G09G 3/2085; G09G 3/32; G09G 3/3233; G09G 2330/028; G09G 2320/0295; G09G 2320/043; G09G 2230/00; G09G 2354/00
See application file for complete search history.

(56) References Cited

U.S. PATENT DOCUMENTS

| | | | | |
|---|---|---|---|---|
| 2021/0201806 | A1* | 7/2021 | Feng | G11C 19/28 |
| 2021/0217376 | A1* | 7/2021 | Yuan | G09G 3/3677 |
| 2021/0319742 | A1* | 10/2021 | Feng | G09G 3/3677 |
| 2022/0310021 | A1* | 9/2022 | Feng | G11C 19/28 |

* cited by examiner

SHIFT REGISTER, GATE DRIVER CIRCUIT AND DISPLAY DEVICE

CROSS-REFERENCE TO RELATED APPLICATION

This application is the United States national phase of International Patent Application No. PCT/CN2023/124824, filed Oct. 16, 2023, the disclosure of which is hereby incorporated by reference in its entirety.

BACKGROUND OF THE INVENTION

Field of the Invention

The present disclosure relates to the field of display technologies, and in particular, to a shift register, a gate driver circuit and a display device.

Description of Related Art

With the development of display technologies, high-resolution and narrow-frame display devices have become one of mainstream development trends in the display field. Therefore, the display device uses a gate driver on array (GOA) circuit, that is, a circuit formed after the gate driver circuit in the display device is directly integrated into a non-display area of an array substrate. The circuit can replace an external driver chip of the array substrate and has advantages of low cost, fewer processes and high production capacity.

SUMMARY OF THE INVENTION

In an aspect, a shift register is provided. The shift register includes a shift register unit and a first detection circuit. The shift register unit includes an input sub-circuit and an output sub-circuit. The input sub-circuit is electrically connected to a pull-up node, an input control terminal and an input signal terminal; and the input sub-circuit is configured to transmit a signal of the input signal terminal to the pull-up node under control of the input control terminal. The output sub-circuit is electrically connected to the pull-up node, a clock signal terminal and an output signal terminal; and the output sub-circuit is configured to receive a clock signal from the clock signal terminal, and provide an output signal to the output signal terminal based on the received clock signal under control of a voltage at the pull-up node, so that the output signal terminal outputs a gate drive signal. The first detection circuit is electrically connected to the shift register unit, and the first detection circuit is electrically connected to the pull-up node and the clock signal terminal. The first detection circuit is configured to obtain a voltage difference at the pull-up node within a first interval time, and perform compensation on a voltage of the clock signal from the clock signal terminal based on the voltage difference at the pull-up node within the first interval time. The first interval time is an interval time between a first moment and a second moment, and the voltage difference at the pull-up node within the first interval time is within a first set range.

In some embodiments, the first detection circuit includes a first sensing sub-circuit, a first detection control sub-circuit and a first analog-to-digital conversion sub-circuit. The first detection control sub-circuit is electrically connected to the first sensing sub-circuit, the pull-up node and a first detection control terminal, and is configured to output the voltage at the pull-up node to the first sensing sub-circuit under control of the first detection control terminal. The first sensing sub-circuit is configured to detect an associated voltage value of a voltage value of the pull-up node at the first moment and an associated voltage value of a voltage value of the pull-up node at the second moment. At a same moment, an associated voltage value of a voltage value of the pull-up node is positively correlated with the voltage value of the pull-up node. The first analog-to-digital conversion sub-circuit is electrically connected to the first sensing sub-circuit and the clock signal terminal, and is configured to obtain the voltage difference at the pull-up node within the first interval time based on the associated voltage value of the voltage value of the pull-up node at the first moment and the associated voltage value of the voltage value of the pull-up node at the second moment, generate a compensation voltage based on the voltage difference at the pull-up node within the first interval time, and transmit the compensation voltage to the clock signal terminal.

In some embodiments, the first sensing sub-circuit includes a first sensing line, a first sensing capacitor and a first switch. The first sensing line is electrically connected to the first detection control sub-circuit, the first sensing line is electrically connected to a first electrode of the first sensing capacitor, a second electrode of the first sensing capacitor is grounded, and the first switch is electrically connected between the first sensing line and the first analog-to-digital conversion sub-circuit.

In some embodiments, the first detection control sub-circuit includes a first detection control transistor. A gate of the first detection control transistor is electrically connected to the first detection control terminal, a first electrode of the first detection control transistor is electrically connected to the pull-up node, and a second electrode of the first detection control transistor is electrically connected to the first sensing sub-circuit.

In some embodiments, the first detection control sub-circuit further includes a reverse bias transistor. A gate of the reverse bias transistor is electrically connected to the second electrode of the first detection control transistor, a first electrode of the reverse bias transistor is electrically connected to a first power supply signal terminal, and a second electrode of the reverse bias transistor is electrically connected to the first sensing sub-circuit.

In some embodiments, the first detection circuit further includes a first voltage divider sub-circuit, and the first voltage divider sub-circuit includes at least two first-type voltage divider resistors connected in series. A first terminal of the first voltage divider sub-circuit is electrically connected to the first detection control sub-circuit, a second terminal of the first voltage divider sub-circuit is grounded, and a third terminal of the first voltage divider sub-circuit is electrically connected to the first sensing sub-circuit. The third terminal of the first voltage divider sub-circuit is a node at which two adjacent first-type voltage divider resistors are electrically connected.

In some embodiments, the shift register unit further includes a pull-down sub-circuit and a pull-down control sub-circuit. The pull-down sub-circuit is electrically connected to a pull-down node, the output signal terminal and a pull-down voltage terminal; and the pull-down sub-circuit is configured to transmit a voltage at the pull-down voltage terminal to the output signal terminal under control of a voltage at the pull-down node. The pull-down control sub-circuit is electrically connected to the pull-up node, the pull-down node, a second power supply signal terminal and a third power supply signal terminal; and the pull-down control sub-circuit is configured to control the voltage at the pull-down node under control of the pull-up node, the second power supply signal terminal and the third power supply signal terminal. The shift register further includes a second detection circuit electrically connected to the shift register unit. The second detection circuit is electrically connected to the output signal terminal and the second power supply signal terminal; and the second detection circuit is configured to obtain a voltage difference at the output signal terminal within a second interval time, and perform compensation on a voltage of a second power supply signal of the second power supply signal terminal based on the voltage difference at the output signal terminal within the second interval time. The second interval time is an interval time between a third moment and a fourth moment, and the voltage difference at the output signal terminal within the second interval time is within a second set range.

In some embodiments, the second detection circuit includes a second sensing sub-circuit, a second detection control sub-circuit and a second analog-to-digital conversion sub-circuit. The second detection control sub-circuit is electrically connected to the second sensing sub-circuit, the output signal terminal and a second detection control terminal, and is configured to transmit a voltage at the output signal terminal to the second sensing sub-circuit under control of the second detection control terminal. The second sensing sub-circuit is configured to detect an associated voltage value of a voltage value of the output signal terminal at the third moment and an associated voltage value of a voltage value of the output signal terminal at the fourth moment. At a same moment, an associated voltage value of a voltage value of the output signal terminal is positively correlated with the voltage value of the output signal terminal. The second analog-to-digital conversion sub-circuit is electrically connected to the second sensing sub-circuit and the second power supply signal terminal, and is configured to obtain the voltage difference at the output signal terminal within the second interval time based on the associated voltage value of the voltage value of the output signal terminal at the third moment and the associated voltage value of the voltage value at the fourth moment, generate a compensation voltage based on the voltage difference at the output signal terminal within the second interval time, and transmit the compensation voltage to the second power supply signal terminal.

In some embodiments, the second sensing sub-circuit includes a second sensing line, a second sensing capacitor and a second switch. The second sensing line is electrically connected to the second detection control sub-circuit, the second sensing line is electrically connected to a first electrode of the second sensing capacitor, a second electrode of the second sensing capacitor is grounded, and the second switch is electrically connected between the second sensing line and the second analog-to-digital conversion sub-circuit.

In some embodiments, the second detection control sub-circuit includes a second detection control transistor. A gate of the second detection control transistor is electrically connected to the second detection control terminal, a first electrode of the second detection control transistor is electrically connected to the output signal terminal, and a second electrode of the second detection control transistor is electrically connected to the second sensing sub-circuit.

In some embodiments, the second detection circuit further includes a second voltage divider sub-circuit; and the second voltage divider sub-circuit includes at least two second-type voltage divider resistors connected in series. A first terminal of the second voltage divider sub-circuit is electrically connected to the second detection control sub-circuit, a second terminal of the second voltage divider sub-circuit is grounded, and a third terminal of the second voltage divider sub-circuit is electrically connected to the second sensing sub-circuit. The third terminal of the second voltage divider sub-circuit is a node at which two adjacent second-type voltage divider resistors are electrically connected.

In some embodiments, the output sub-circuit includes a cascade output sub-circuit and at least one gating output sub-circuit, the clock signal terminal includes a cascade clock signal terminal and at least one gating clock signal terminal, and the output signal terminal includes a cascade output signal terminal and at least one gating output signal terminal. The cascade output sub-circuit is electrically connected to the pull-up node, the cascade clock signal terminal and the cascade output signal terminal. A gating output sub-circuit is electrically connected to the pull-up node, a gating clock signal terminal and a gating output signal terminal; and the gating output signal terminal is configured to be electrically connected to a gate line. The pull-down sub-circuit includes a cascade pull-down sub-circuit and at least one gating pull-down sub-circuit, and the pull-down voltage terminal includes a first pull-down voltage terminal and a second pull-down voltage terminal. The cascade pull-down sub-circuit is electrically connected to the cascade output signal terminal, the pull-down node and the first pull-down voltage terminal. Each gating pull-down sub-circuit is electrically connected to a gating output signal terminal, the pull-down node and the second pull-down voltage terminal.

In some embodiments, the second detection control sub-circuit includes a cascade second detection control sub-circuit, and the second detection control terminal includes a cascade second detection control terminal. The cascade second detection control sub-circuit is electrically connected to the cascade output signal terminal and the cascade second detection control terminal.

In some embodiments, the second detection control sub-circuit includes at least one gating second detection control sub-circuit, and the second detection control terminal includes at least one gating second detection control terminal. A gating second detection control sub-circuit is electrically connected to one of the at least one gating output signal terminal and electrically connected to a gating second detection control terminal.

In some embodiments, the output signal terminal includes a plurality of gating output signal terminals, the second detection control sub-circuit includes a plurality of gating second detection control sub-circuits, and the second detection control terminal includes a plurality of gating second detection control terminals.

Each gating second detection control sub-circuit is electrically connected to a gating output signal terminal, each gating second detection control sub-circuit is electrically connected to a gating second detection control terminal, and the plurality of gating second detection control sub-circuits are all electrically connected to the second sensing sub-circuit. The second detection circuit is configured to respectively obtain voltage differences at the plurality of gating output signal terminals within the second interval time, and perform compensation on the voltage of the second power supply signal of the second power supply signal terminal based on an average value of the voltage differences at the plurality of gating output signal terminals within the second interval time.

In some embodiments, the second detection control sub-circuit further includes a cascade second detection control sub-circuit, and the cascade second detection control sub-circuit is electrically connected to the cascade output signal terminal, a cascade second detection control terminal and the second sensing sub-circuit. The second detection circuit is configured to respectively obtain the voltage differences at the plurality of gating output signal terminals within the second interval time and a voltage difference at the cascade output signal terminal within the second interval time, and perform compensation on the voltage of the second power supply signal of the second power supply signal terminal based on an average value of the voltage differences at the plurality of gating output signal terminals within the second interval time and the voltage difference at the cascade output signal terminal within the second interval time.

In some embodiments, the output sub-circuit further includes a sensing output sub-circuit, the clock signal terminal further includes a sensing clock signal terminal, and the output signal terminal further includes a sensing output signal terminal. The sensing output sub-circuit is electrically connected to the pull-up node, the sensing clock signal terminal and the sensing output signal terminal. The pull-down sub-circuit further includes a sensing pull-down sub-circuit, the pull-down voltage terminal further includes a third pull-down voltage terminal, and the sensing pull-down sub-circuit is electrically connected to the pull-down node, the sensing output signal terminal and the third pull-down voltage terminal. The second detection control sub-circuit includes a sensing second detection control sub-circuit, and the second detection control terminal includes a sensing second detection control terminal. The sensing second detection control sub-circuit is electrically connected to the sensing second detection control terminal, the sensing output signal terminal, and the second sensing sub-circuit. The second detection circuit is configured to obtain a voltage difference at the sensing output signal terminal within the second interval time, and perform compensation on the voltage of the second power supply signal of the second power supply signal terminal based on the voltage difference at the sensing output signal terminal within the second interval time.

In some embodiments, the second detection circuit is further electrically connected to the pull-down node. The second detection circuit includes a third detection control sub-circuit. The third detection control sub-circuit is electrically connected to the pull-down node, the second sensing sub-circuit and a third detection control terminal, and the third detection control sub-circuit is configured to transmit a voltage at the pull-down node to the second sensing sub-circuit under control of the third detection control terminal. The second detection circuit is configured to obtain a voltage difference at the pull-down node within the second interval time, and perform compensation on the voltage of the second power supply signal of the second power supply signal terminal based on the voltage difference at the pull-down node within the second interval time.

In some embodiments, the input sub-circuit includes a first transistor, a second transistor, a third transistor and a fourth transistor. A gate of the first transistor and a gate of the second transistor are electrically connected to the input control terminal, a first electrode of the first transistor is electrically connected to the input signal terminal, a second electrode of the first transistor is electrically connected to a first electrode of the second transistor, and a second electrode of the second transistor is electrically connected to the pull-up node. A gate and a first electrode of the third transistor are electrically connected to a fourth power supply signal terminal, a second electrode of the third transistor is electrically connected to a first electrode of the fourth transistor, a gate of the fourth transistor is electrically connected to the fourth power supply signal terminal, and a second electrode of the fourth transistor is electrically connected to the first electrode of the second transistor.

In some embodiments, the output sub-circuit includes a cascade output sub-circuit and at least one gating output sub-circuit. The cascade output sub-circuit includes a cascade output transistor and a cascade capacitor, and each gating output sub-circuit includes a gating output transistor and a gating capacitor. A gate of the cascade output transistor is electrically connected to the pull-up node, a first electrode of the cascade output transistor is electrically connected to a cascade clock signal terminal, and a second electrode of the cascade output transistor is electrically connected to a cascade output signal terminal. Two terminals of the cascade capacitor are electrically connected to the pull-up node and the cascade output signal terminal. A gate of the gating output transistor is electrically connected to the pull-up node, a first electrode of the gating output transistor is electrically connected to a gating clock signal terminal, and a second electrode of the gating output transistor is electrically connected to a gating output signal terminal. The shift register unit further includes a pull-down sub-circuit electrically connected to a pull-down node, the output signal terminal and a pull-down voltage terminal, the pull-down sub-circuit includes a cascade pull-down sub-circuit and at least one gating pull-down sub-circuit. The cascade pull-down sub-circuit includes a cascade pull-down transistor, and a gating pull-down sub-circuit includes a gating pull-down transistor. A gate of the cascade pull-down transistor is electrically connected to a pull-down node, a first electrode of the cascade pull-down transistor is electrically connected to a first pull-down voltage terminal, and a second electrode of the cascade pull-down transistor is electrically connected to the cascade output signal terminal. A gate of the gating pull-down transistor is electrically connected to the pull-down node, a first electrode of the gating pull-down transistor is electrically connected to a second pull-down voltage terminal, and a second electrode of the gating pull-down transistor is electrically connected to the gating output signal terminal.

In some embodiments, the shift register unit further includes a pull-down control sub-circuit, and the pull-down control sub-circuit includes a third transistor, a sixth transistor, a seventh transistor, an eighth transistor and a ninth transistor. A gate of the fifth transistor is electrically connected to a second electrode of the ninth transistor, a first electrode of the fifth transistor is electrically connected to a second power supply signal terminal, and a second electrode of the fifth transistor is electrically connected to a first electrode of the sixth transistor. Gates of the sixth transistor and the seventh transistor are electrically connected to the pull-down node, a second electrode of the sixth transistor is electrically connected to a third power supply signal terminal, a second electrode of the seventh transistor is electrically connected to a fifth power supply signal terminal, and a first electrode of the seventh transistor is electrically connected to a second electrode of the ninth transistor. A gate of the ninth transistor is electrically connected to the second power supply signal terminal, a first electrode of the ninth transistor is electrically connected to a second electrode of the eighth transistor, and a gate and a first electrode of the eighth transistor are electrically connected to the second power supply signal terminal.

In some embodiments, the shift register unit further includes a reset sub-circuit, a pull-up node first noise reduction sub-circuit, a pull-up node second noise reduction sub-circuit, a pull-down node first noise reduction sub-circuit and/or a pull-down node second noise reduction sub-circuit. The reset sub-circuit is electrically connected to a global reset control signal terminal, the pull-up node and the third power supply signal terminal; and the reset sub-circuit is configured to reset the pull-up node under control of the global reset control signal terminal and the third power supply signal terminal. The pull-up node first noise reduction sub-circuit is electrically connected to a first noise reduction control terminal, the pull-up node and the third power supply signal terminal; and the pull-up node first noise reduction sub-circuit is configured to reduce noise of the pull-up node under control of the first noise reduction control terminal and the third power supply signal terminal. The pull-up node second noise reduction sub-circuit is electrically connected to the pull-down node, the third power supply signal terminal and the pull-up node; and the pull-up node second noise reduction sub-circuit is configured to reduce noise of the pull-up node under control of the pull-down node and the third power supply signal terminal. The pull-down node first noise reduction sub-circuit is electrically connected to the input control terminal, the pull-down node and the third power supply signal terminal; and the pull-down node first noise reduction sub-circuit is configured to reduce noise of the pull-down node under control of the input control terminal and the third power supply signal terminal. The pull-down node second noise reduction sub-circuit is electrically connected to a blanking control clock signal terminal, a blanking control auxiliary signal terminal, the pull-down node and the third power supply signal terminal; and the pull-down node second noise reduction sub-circuit is configured to reduce noise of the pull-down node under control of the blanking control clock signal terminal, the blanking control auxiliary signal terminal and the third power supply signal terminal.

In some embodiments, the reset sub-circuit includes a tenth transistor and an eleventh transistor. Gates of the tenth transistor and the eleventh transistor are electrically connected to the global reset control signal terminal, a first electrode of the tenth transistor is electrically connected to a second electrode of the eleventh transistor, a first electrode of the eleventh transistor is electrically connected to the third power supply signal terminal, and a second electrode of the tenth transistor is electrically connected to the pull-up node. The pull-up node first noise reduction sub-circuit includes a twelfth transistor and a thirteenth transistor. Gates of the twelfth transistor and the thirteenth transistor are both electrically connected to the first noise reduction control terminal, a first electrode of the twelfth transistor is electrically connected to a second electrode of the thirteenth transistor, a first electrode of the thirteenth transistor is electrically connected to the third power supply signal terminal, and a second electrode of the twelfth transistor is electrically connected to the pull-up node. The pull-up node second noise reduction sub-circuit includes a fourteenth transistor and a fifteenth transistor. Gates of the fourteenth transistor and the fifteenth transistor are electrically connected to the pull-down node, a first electrode of the fourteenth transistor is electrically connected to a second electrode of the fifteenth transistor, a first electrode of the fifteenth transistor is electrically connected to the third power supply signal terminal, and a second electrode of the fourteenth transistor is electrically connected to the pull-up node. The pull-down node first noise reduction sub-circuit includes a sixteenth transistor. A gate of the sixteenth transistor is electrically connected to the input control terminal, a first electrode of the sixteenth transistor is electrically connected to the third power supply signal terminal, and a second electrode of the sixteenth transistor is electrically connected to the pull-down node. The pull-down node second noise reduction sub-circuit includes a seventeenth transistor and an eighteenth transistor. A gate of the seventeenth transistor is electrically connected to the blanking control clock signal terminal, a gate of the eighteenth transistor is electrically connected to the blanking control auxiliary signal terminal, a first electrode of the seventeenth transistor is electrically connected to a second electrode of the eighteenth transistor, a first electrode of the eighteenth transistor is electrically connected to the third power supply signal terminal, and a second electrode of the seventeenth transistor is electrically connected to the pull-down node.

In some embodiments, the shift register unit further includes a blanking input sub-circuit. The blanking input sub-circuit is electrically connected to the input control terminal, a blanking control signal terminal, the blanking control clock signal terminal, the blanking control auxiliary signal terminal, a sixth power supply signal terminal and the pull-up node; and the blanking input sub-circuit is configured to input a blanking signal under control of the input control terminal, the blanking control clock signal terminal and the blanking control signal terminal. The blanking input sub-circuit includes a nineteenth transistor, a twentieth transistor, a twenty-first transistor, a twenty-second transistor, a twenty-third transistor, a twenty-fourth transistor and a third capacitor. Gates of the nineteenth transistor and the twenty-third transistor are electrically connected to the blanking control signal terminal, a first electrode of the nineteenth transistor is electrically connected to the input control terminal, and a second electrode of the nineteenth transistor is electrically connected to a first electrode of the twentieth transistor. A second electrode of the twentieth transistor is electrically connected to a second electrode of the third capacitor, a first electrode of the third capacitor is electrically connected to the sixth power supply signal terminal, a gate of the twenty-first transistor is electrically connected to the second electrode of the third capacitor, a second electrode of the twenty-first transistor is electrically connected to the second electrode of the nineteenth transistor, a first electrode of the twenty-first transistor is electrically connected to the sixth power supply signal terminal, a gate of the twenty-second transistor is electrically connected to the second electrode of the third capacitor, a first electrode of the twenty-second transistor is electrically connected to the blanking control clock signal terminal, a second electrode of the twenty-second transistor is electrically connected to a first electrode of the twenty-third transistor, a second electrode of the twenty-third transistor is electrically connected to a first electrode of the twenty-fourth transistor, gates of the twenty-third transistor and the twenty-fourth transistor are electrically connected to the blanking control clock signal terminal, and a second electrode of the twenty-fourth transistor is electrically connected to the pull-up node.

In some embodiments, the shift register unit further includes a voltage stabilization sub-circuit, and the voltage stabilization sub-circuit is electrically connected to the pull-up node and a seventh power supply signal terminal. The voltage stabilization sub-circuit includes a twenty-fifth transistor. A gate of the twenty-fifth transistor is electrically connected to the pull-up node, a first electrode of the twenty-fifth transistor is electrically connected to the seventh power supply signal terminal, and a second electrode of the twenty-fifth transistor is electrically connected to a first connection node, a second connection node and a third connection node. The first connection node is a connection node between the twenty-third transistor and the twenty-fourth transistor, the second connection node is a connection node between the tenth transistor and the eleventh transistor, and the third connection node is a connection node between the twelfth transistor and the thirteenth transistor.

In another aspect, a gate driver circuit is provided. The gate driver circuit includes N shift registers that are cascaded. The shift register includes a shift register unit, and the shift register unit is the shift register unit in the shift register as described in any of the above aspect. The gate driver circuit further includes dummy shift registers and/or sensing shift registers. A dummy shift register is electrically connected to first n-stage shift registers in the N shift registers, or a dummy shift register is electrically connected to last m-stage shift registers in the N shift registers. The dummy shift register includes a first detection circuit, or the dummy shift register includes a first detection circuit and a second detection circuit. Each K shift registers in the N shift registers constitute a group, and a sensing shift register is located between two adjacent groups of shift registers. A cascade relationship of the sensing shift register is same as a cascade relationship of a k-th shift register in a group of shift registers. The sensing shift register includes a first detection circuit, or the sensing shift register includes a first detection circuit and a second detection circuit. The first detection circuits are each a first detection circuit in the shift register as described in any of the above aspect, and the second detection circuits are each a second detection circuit in the shift register as described in any of the above aspect.

In yet another aspect, a display device is provided. The display device includes the gate driver circuit as described in the above aspect.

In some embodiments, the shift register includes a first detection circuit and a second detection circuit, the first detection circuit includes a first sensing line, and the second detection circuit includes a second sensing line. The display device further includes a plurality of sub-pixels arranged in an array and sensing lines. A sensing line is located between the plurality of sub-pixels, and the sensing line is electrically connected to a column of sub-pixels. The sensing line is also used as the first sensing line and/or the second sensing line in the shift register.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. The accompanying drawings are used to provide further understanding of the present disclosure and constitute part of the present disclosure. The exemplary embodiments in the present disclosure and the descriptions thereof are used to explain the present disclosure, but are not limitations on an actual size of a product, an actual process of a method and an actual timing of a signal to which the embodiments of the present disclosure relate.

DESCRIPTION OF THE INVENTION

Figure 1:
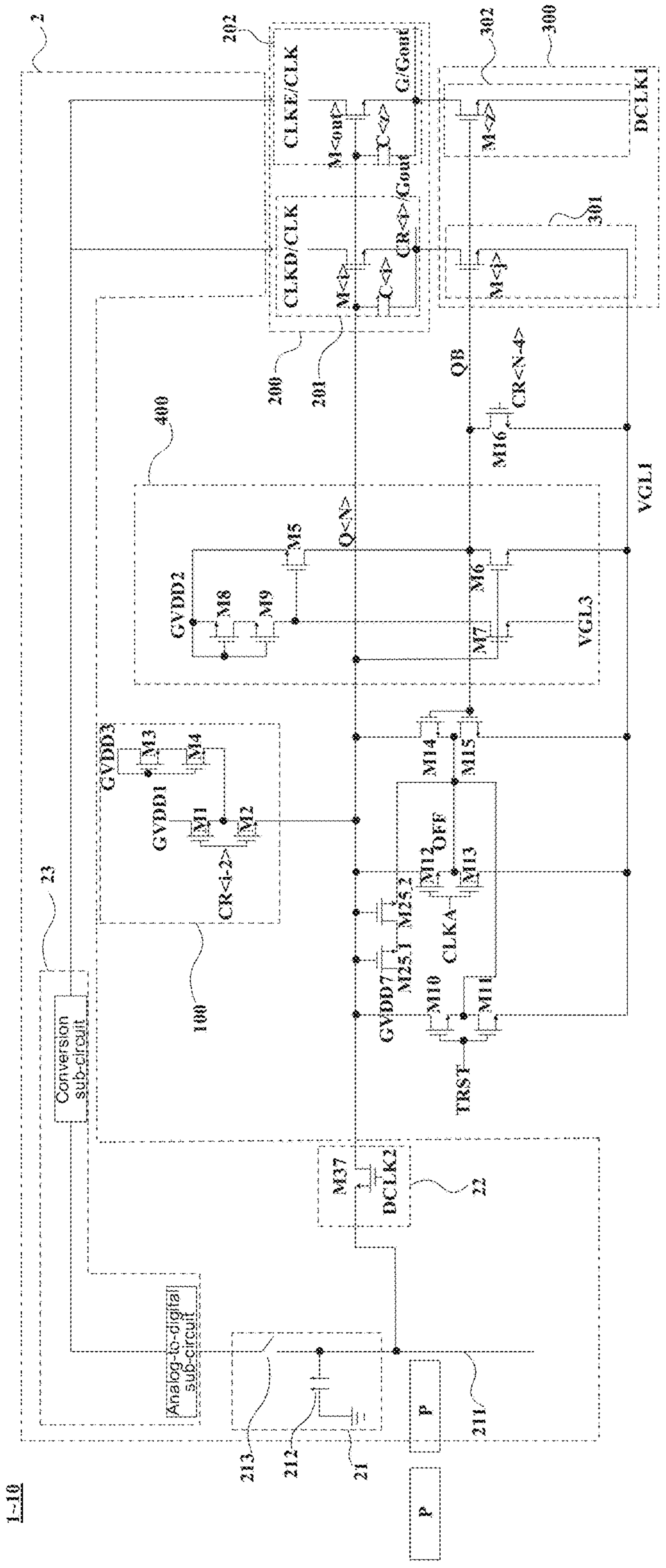
FIG. 1 is a circuit diagram of a shift register, in accordance with some embodiments of the present disclosure.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, features defined with "first" or "second" may explicitly or implicitly include one or more of the features. In the description of the embodiments of the present disclosure, the term "a plurality of" or "the plurality of" means two or more unless otherwise specified.

In the description of some embodiments, the expressions "coupled" and "connected" and derivatives thereof may be used. For example, the term "connection" should be understood in a broad sense. For example, the "connection" may be a fixed connection, a detachable connection, or of an integrated structure; it may be a direct connection or an indirect connection by an intermediate medium. The term "coupled" indicates, for example, that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is optionally construed as "when" or "in a case where" or "in response to determining that" or "in response to detecting", depending on the context. Similarly, the phrase "if it is determined that" or "if [a stated condition or event] is detected" is optionally construed as "in a case where it is determined that" or "in response to determining that" or "in a case where [the stated condition or event] is detected" or "in response to detecting [the stated condition or event]", depending on the context.

The phrase "applicable to" or "configured to" as used herein indicates an open and inclusive expression, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

The term "about", "substantially" or "approximately" as used herein includes a stated value and an average value within an acceptable range of deviation of a particular value. The acceptable range of deviation is determined by a person of ordinary skill in the art in consideration of the measurement in question and errors associated with the measurement of a particular quantity (i.e., limitations of the measurement system).

Transistors used in circuits provided in the embodiments of the present disclosure may be thin film transistors, field effect transistors (e.g., oxide thin film transistors) or other switching devices with same properties, and the embodiments of the present disclosure are described by taking an example of the thin film transistors.

In the presents embodiments, coupling modes of a drain and a source of each transistor may be interchanged, and therefore, there is actually no difference between the drain and source of each transistor in the embodiments of the present disclosure. Here, just to distinguish two electrodes of the transistor except for a control electrode (i.e., a gate), one of the electrodes is called the drain and the other thereof is called the source. The thin film transistor used in the embodiments of the present disclosure may be an N-type transistor or a P-type transistor. In the embodiments of the present disclosure, for an N-type thin film transistor, the first electrode is referred to as the source, and the second electrode is referred to as the drain. In the following embodiments, description is made by taking an example where the thin film transistors are N-type transistors, that is, when a signal of the control electrode is at a high level, the thin film transistor is turned on. It can be imagined that for a P-type transistor, timing variation of a driving signal needs to be adjusted accordingly, and specific details are not described here, but should also be within the scope of protection of the present disclosure.

In the circuits in the embodiments of the present disclosure, nodes such as a pull-up node and a pull-down node do not represent actual components, but each represent a junction of related electrical connections in a circuit diagram. That is, these nodes are each a point that is equivalent to the junction of the related electrical connections in the circuit diagram.

In the embodiments of the present disclosure, for example, in a case where each circuit is implemented by N-type transistors, the term "pull up" refers to charging a node or an electrode of a transistor, so that an absolute value of a level at the node or the electrode increases, thereby achieving operating (e.g., turning on) of a corresponding transistor; and the term "pull down" refers to discharging a node or an electrode of a transistor, so that an absolute value of a level at the node or the electrode decreases, thereby achieving operating (e.g., turning off) of a corresponding transistor. As another example, in a case where each circuit is implemented by P-type transistors, the term "pull up" refers to discharging a node or an electrode of a transistor, so that an absolute value of a level at the node or the electrode decreases, thereby achieving operating (e.g., turning on) of a corresponding transistor; and the term "pull down" refers to charging a node or an electrode of a transistor, so that an absolute value of a level at the node or the electrode increases, thereby achieving operating (e.g., turning off) of a corresponding transistor.

Hereinafter, the circuits provided in the embodiments of the present disclosure are described by considering an example in which all transistors are N-type transistors.

Some embodiments of the present disclosure provide a display device. The display device may be any device that displays images whether in motion (e.g., a video) or stationary (e.g., a static image), and regardless of text or image. More specifically, it is expected that the embodiments may be implemented in or associated with a variety of electronic devices. The variety of electronic devices may include (but are not limit to), for example, mobile phones, wireless devices, personal digital assistants (PDAs), hand-held or portable computers, global positioning system (GPS) receivers/navigators, cameras, MPEG-4 Part 14 (MP4) video players, video cameras, game consoles, watches, clocks, calculators, TV monitors, flat-panel displays, computer monitors, car displays (e.g., odometer displays), navigators, cockpit controllers and/or displays, camera view displays (e.g., display of rear view camera in vehicles), electronic photos, electronic billboards or signs, projectors, architectural structures, packaging and aesthetic structures (e.g., displays for displaying an image of a piece of jewelry), etc.

The display device generally includes display driver circuits and a plurality of sub-pixel units arranged in an array. The display driver circuits are configured to drive the plurality of sub-pixel units arranged in an array, so that the display device displays images. In some examples, the display driver circuits include a source driver circuit and a gate driver circuit. The gate driver circuit includes a plurality of shift register units. The shift register unit in the gate driver circuit is mainly composed of transistors, capacitor(s), and other elements. During operation of the shift register unit, voltages of internal control node(s) are controlled by the transistors and the capacitor(s), thereby realizing output of a scan signal.

For example, the above display device is any of a liquid crystal display (LCD) device, a light-emitting diode (LED) display device, an organic light-emitting diode (OLED) display device, a micro LED display device or a mini LED display device, which is not specifically limited in the present disclosure.

The following embodiments of the present disclosure are all described by taking an example in which the display device is an OLED display device.

Currently, in order to reduce production costs, the display devices usually use the gate driver circuit design. An oxide OLED is the mainstream in current display devices. However, an input transistor experiences positive drift usually due to long-term use, which causes insufficient input capacity in severe cases, and further causes the gate driver circuit to fail. In addition, a pull-down transistor will also experience serious positive drift as the positive pressure goes on over time, which makes an element at the pull-down control voltage unable to work normally, and finally cause the gate driver circuit to fail.

In light of this, embodiments of the present disclosure provide a shift register 10. As shown in FIG. 1, the shift register 10 includes shift register units 1 and first detection circuits 2. The shift register unit 1 includes an input sub-circuit 100 and an output sub-circuit 200.

The input sub-circuit 100 is electrically connected to a pull-up node Q<N>, an input control terminal CR<i−2> and an input signal terminal GVDD1, and the input sub-circuit 100 is configured to transmit a signal of the input signal terminal GVDD1 to the pull-up node Q<N> under control of the input control terminal CR<i−2>.

For example, in a case where a level of an input control signal transmitted by the input control terminal CR<i−2> is a working level, the input sub-circuit 100 is turned on under action of the input control signal to receive the signal of the input signal terminal GVDD1 and transmit the signal of the input signal terminal GVDD1 to the pull-up node Q<N>, so as to charge the pull-up node Q<N>, so that a voltage at the pull-up node Q<N> increases.

A level of a certain signal is a working level, which means that the level of the signal can allow a circuit controlled by the signal to be turned on and start working. For example, for a case where the transistor controlled by the input control signal transmitted by the input control terminal CR<i−2> is an N-type transistor, the working level of the input control signal transmitted by the input control terminal CR<i−2> is a high level; and in a case where the input control signal transmitted by the input control terminal CR<i−2> is at a high level, the transistor is turned on. For example, for a case where the transistor controlled by the input control signal transmitted by the input control terminal CR<i−2> is a P-type transistor, the working level of the input control signal transmitted by the input control terminal CR<i−2> is a low level; and in a case where the input control signal transmitted by the input control terminal CR<i−2> is at a low level, the transistor is turned on.

The output sub-circuit 200 is electrically connected to the pull-up node Q<N>, a clock signal terminal CLK and an output signal terminal Gout. The output sub-circuit 200 is configured to receive a clock signal from the clock signal terminal CLK and provide an output signal to the output signal terminal Gout based on the received clock signal under control of a voltage at the pull-up node Q<N>, so that the output signal terminal Gout outputs a gate drive signal.

For example, in a case where a level transmitted at the pull-up node Q<N> is a working level, the output sub-circuit 200 is turned on under control of the voltage at the pull-up node Q<N> to receive a signal of the clock signal terminal CLK and transmit the signal of the clock signal terminal CLK to the output signal terminal Gout, so that the output signal terminal Gout outputs a gate drive signal.

The first detection circuit 2 is electrically connected to the shift register unit 1, and the first detection circuit 2 is electrically connected to the pull-up node Q<N> and the clock signal terminal CLK. The first detection circuit 2 is configured to obtain a voltage difference at the pull-up node Q<N> within a first interval time, and perform compensation on a voltage of the clock signal from the clock signal terminal CLK based on the voltage difference at the pull-up node Q<N> within the first interval time. The first interval time is an interval time between a first moment and a second moment, and the voltage difference at the pull-up node within the first interval time is within a first set range.

In some embodiments, the input sub-circuit 100 includes input transistors. For example, as shown in FIG. 1, the input sub-circuit 100 includes a first transistor M1, a second transistor M2, a third transistor M3 and a fourth transistor M2. In a case where the input transistors (the first transistor M1 and the second transistor M2) are turned on, the signal of the input signal terminal GVDD1 is transmitted to the pull-up node Q<N>. After the display device has been used for a long time, the input transistor(s) will experience a positive drift phenomenon, and thus cause the input transistor(s) unable to be fully turned on under action of the input control signal, so that the signal of the input signal terminal GVDD1 cannot be fully transmitted to the pull-up node Q<N>, that is, the input capacity is insufficient, and the voltage at the pull-up node Q<N> cannot reach a set voltage value. In a case where the voltage at the pull-up node Q<N> is insufficient, the transistor(s) of the output sub-circuit 200 cannot be fully turned on under the control of the voltage at the pull-up node Q<N>, thereby causing the output sub-circuit 200 to fail to output normally.

The shift register unit 1 in the embodiments of the present disclosure can be distributed in the gate driver circuit as a unit under test, the voltage difference at the pull-up node Q<N> within the first interval time is obtained through the above first detection circuit 2, and then compensation is performed on the voltage of the clock signal of the clock signal terminal CLK based on the voltage difference. In this way, the output sub-circuit 200 may output the voltage after compensation of the clock signal of the clock signal terminal CLK, thereby avoiding the problem that the output sub-circuit 200 cannot output normally due to insufficient input capacity caused by the positive drift of the transistor(s) in the input sub-circuit 100. It will be noted that the first moment here is a moment of an initial state in which the shift register unit 1 works, and the second moment here is a moment of a state in which the shift register unit 1 has worked for a period of time.

It will be noted that the above first set range is a range greater than-1 V and less than 0 V, or a range greater than 0 V and less than 1.5 V. If the voltage difference at the pull-up node within the first interval time is within the first set range, the first detection circuit can perform effective compensation on the voltage of the clock signal of the clock signal terminal CLK. If the voltage difference at the pull-up node within the first interval time is outside the first set range, the first detection circuit does not need to or cannot perform effective compensation on the voltage of the clock signal of the clock signal terminal CLK. For example, if the voltage difference at the pull-up node within the first interval time is 0, it means that the shift register does not have the problem of insufficient input capacity, and there is no need to perform compensation on the voltage of the clock signal of the clock signal terminal CLK; and if the voltage difference at the pull-up node within the first interval time is relatively large, it means that the positive drift phenomenon of the input transistor(s) is relatively serious, and the first detection circuit cannot perform effective compensation on the voltage of the clock signal of the clock signal terminal CLK.

In some embodiments, with continued reference to FIG. 1, the first detection circuit 2 includes a first sensing sub-circuit 21, a first detection control sub-circuit 22 and a first analog-to-digital conversion sub-circuit 23. The first detection control sub-circuit 22 is electrically connected to the first sensing sub-circuit 21, the pull-up node Q<N> and a first detection control terminal DCLK2, and is configured to output the voltage at the pull-up node Q<N> to the first sensing sub-circuit 21 under control of the first detection control terminal DCLK2. The first sensing sub-circuit 21 is configured to detect an associated voltage value of a voltage value of the pull-up node Q<N> at the first moment and an associated voltage value of a voltage value of the pull-up node Q<N> at the second moment. At the same moment, an associated voltage value of a voltage value of the pull-up node is positively correlated with the voltage value of the pull-up node. For example, the associated voltage value of the voltage value of the pull-up node is proportional to the voltage value of the pull-up node, alternatively, a difference between the associated voltage value of the voltage value of the pull-up node and the voltage value of the pull-up node is a constant. Since the first detection circuit 2 only needs to obtain the voltage difference at the pull-up node Q<N> within the first interval time, and the associated voltage value of the voltage value of the pull-up node is related to the voltage value of the pull-up node, a voltage difference of the associated voltage value of the voltage value of the pull-up node within the first interval time may replace the voltage difference at the pull-up node Q<N> within the first interval time.

The first analog-to-digital conversion sub-circuit 23 is electrically connected to the first sensing sub-circuit 21 and the clock signal terminal CLK, and is configured to obtain a voltage difference at the pull-up node Q<N> within the first interval time based on the associated voltage value of the voltage value of the pull-up node Q<N> at the first moment and the associated voltage value of the voltage value of the pull-up node Q<N> at the second moment, generate a compensation voltage based on the voltage difference at the pull-up node Q<N> within the first interval time, and transmit the compensation voltage to the clock signal terminal CLK.

It will be noted that as shown in FIG. 1, the first analog-to-digital conversion sub-circuit 23 may include an analog-to-digital sub-circuit and a conversion sub-circuit that are connected to each other. The analog-to-digital sub-circuit can convert the voltage value of the pull-up node Q<N> from an analog signal to a digital signal, and the conversion sub-circuit is used to obtain the compensation voltage based on the digital signal for subsequent compensation on the voltage at the clock signal terminal CLK.

In some embodiments, referring to FIG. 1, the first sensing sub-circuit 21 includes a first sensing line 211, a first sensing capacitor 212 and a first switch 213. The first sensing line 211 is electrically connected to the first detection control sub-circuit 22, the first sensing line 211 is electrically connected to a first electrode of the first sensing capacitor 212, a second electrode of the first sensing capacitor 212 is grounded, and the first switch 213 is electrically connected between the first sensing line 211 and the first analog-to-digital conversion sub-circuit 23.

For example, as shown in FIG. 1, the first switch 213 can achieve on and off of the first detection circuit 2. The first sensing line 211 electrically connected to the first detection control sub-circuit 22 can transmit a sensing signal to the first analog-to-digital conversion sub-circuit 23 through the on and off of the first switch 213. Through the conversion of the first analog-to-digital conversion sub-circuit 23, the first detection circuit 2 can detect the associated voltage value of the voltage value of the pull-up node Q<N> at the first moment and the second moment, respectively.

In some embodiments, with continued reference to FIG. 1, the first detection control sub-circuit 22 includes a first detection control transistor M37. A gate of the first detection control transistor M37 is electrically connected to the first detection control terminal DCLK2, a first electrode of the first detection control transistor M37 is electrically connected to the pull-up node Q<N>, and a second electrode of the first detection control transistor M37 is electrically connected to the first sensing sub-circuit 21.

For example, in a case where the first detection control transistor M37 is an N-type transistor, a working level of a first detection control signal transmitted by the first detection control terminal DCLK2 is a high level. In a case where the first detection control signal transmitted by the first detection control terminal DCLK2 is at a high level, the first detection control transistor M37 is turned on to transmit the voltage at the pull-up node Q<N> to the first sensing sub-circuit 21.

Figure 2:
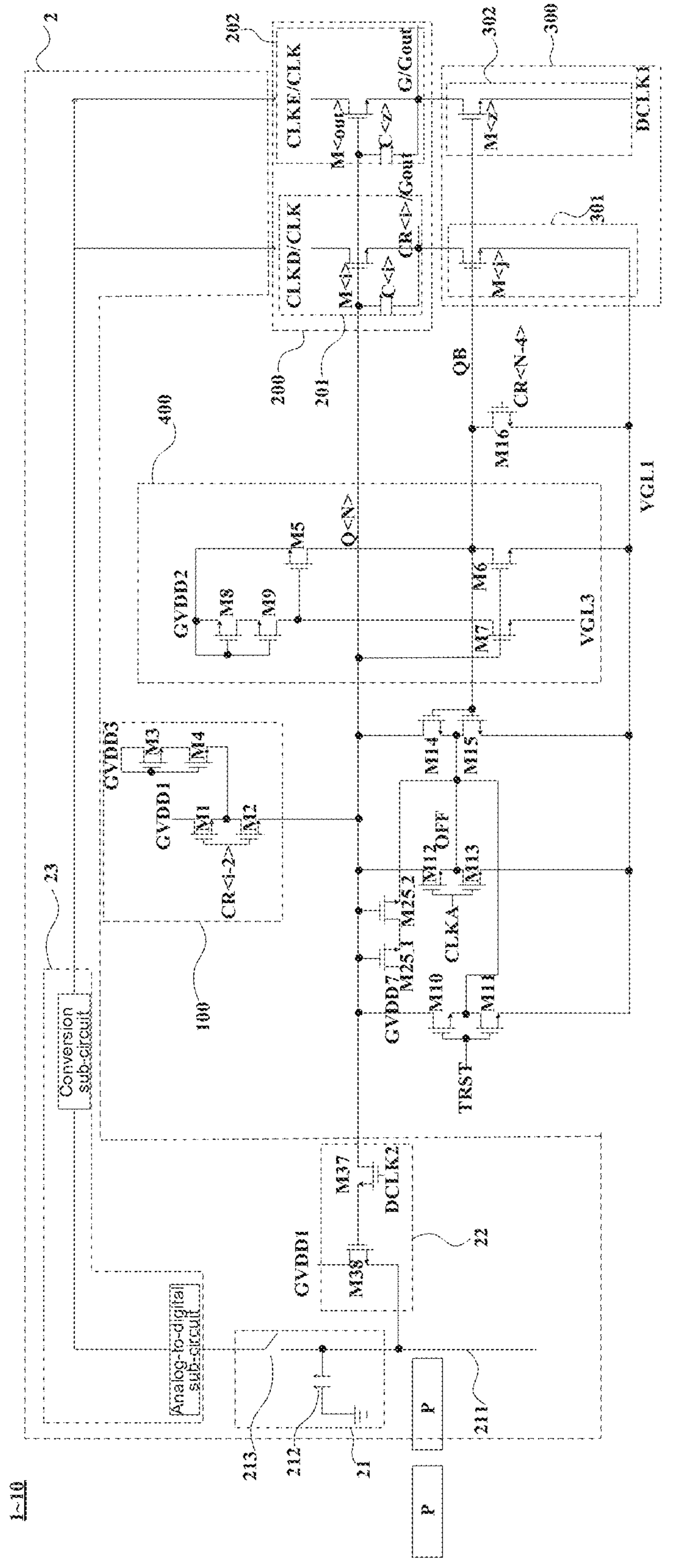
FIG. 2 is a circuit diagram of another shift register, in accordance with some embodiments of the present disclosure.

In some embodiments, as shown in FIG. 2, the first detection control sub-circuit 22 further includes a reverse bias transistor M38. A gate of the reverse bias transistor M38 is electrically connected to the second electrode of the first detection control transistor M37, a first electrode of the reverse bias transistor M38 is electrically connected to a first power supply signal terminal GVDD1 (i.e., the input signal terminal GVDD1), and a second electrode of the reverse bias transistor M38 is electrically connected to the first sensing sub-circuit 21.

For example, the gate of the reverse bias transistor M38 is electrically connected to the second electrode of the first detection control transistor M37. The reverse bias transistor M38 can provide a voltage at the first power supply signal terminal GVDD1 to the second electrode of the reverse bias transistor M38 under control of a signal transmitted by the first detection control transistor M37, which has a function of preventing electric leakage and avoids voltage loss in a process of the first detection control transistor M37 transmitting the voltage at the pull-up node Q<N>, thereby ensuring effectiveness of the first detection circuit 2 during detection.

Figure 3:
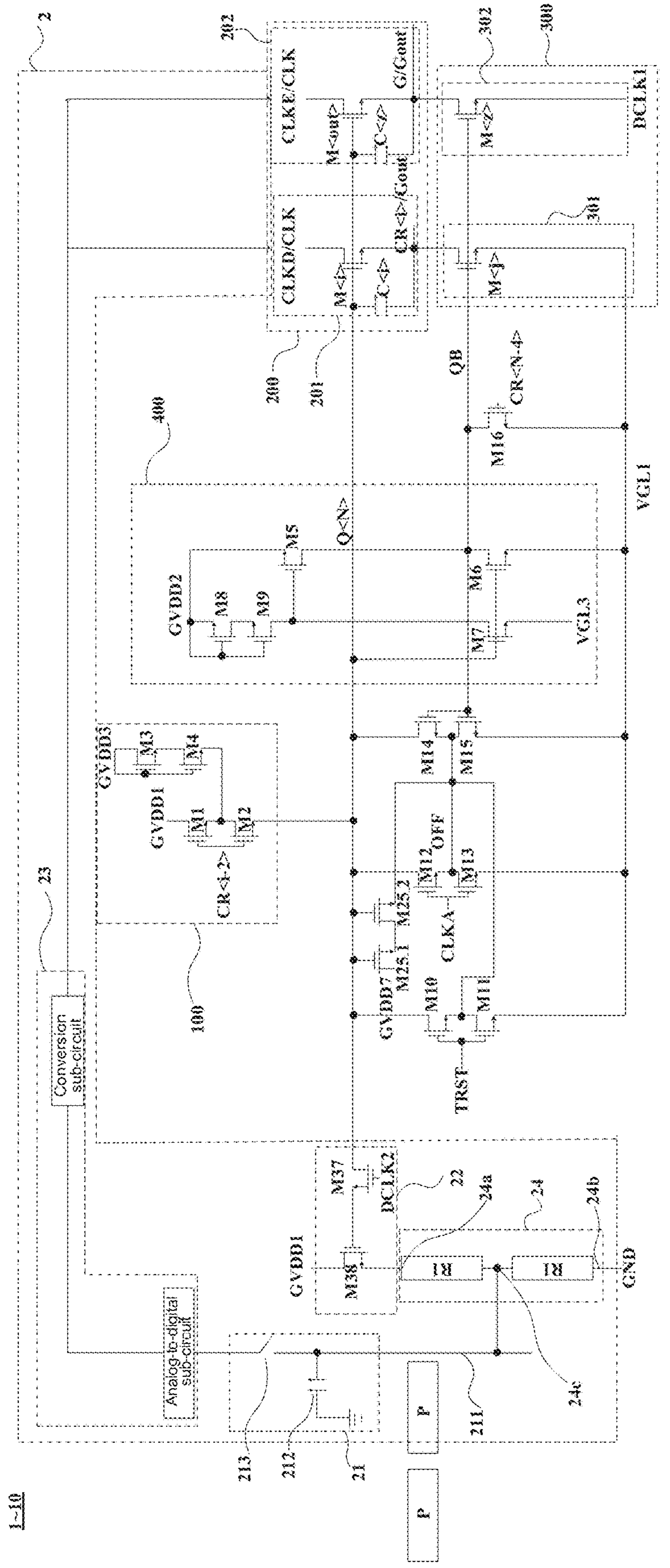
FIG. 3 is a circuit diagram of yet another shift register, in accordance with some embodiments of the present disclosure.

In some embodiments, as shown in FIG. 3, the first detection circuit 2 further includes a first voltage divider sub-circuit 24. The first voltage divider sub-circuit 24 includes at least two first-type voltage divider resistors R1 connected in series with each other. A first terminal 24*a* of the first voltage divider sub-circuit 24 is electrically connected to the first detection control sub-circuit 22, a second terminal 24*b* of the first voltage divider sub-circuit 24 is grounded, and a third terminal 24*c* of the first voltage divider sub-circuit 24 is electrically connected to the first sensing sub-circuit 21. The third terminal 24*c* of the first voltage divider sub-circuit 24 is a node at which two adjacent first-type voltage divider resistors R1 are electrically connected.

For example, referring to FIG. 3, the first terminal 24*a* of the first voltage divider sub-circuit 24 is electrically connected to the first detection control sub-circuit 22, e.g., the first terminal 24*a* of the first voltage divider sub-circuit 24 is electrically connected to the second electrode of the reverse bias transistor M38 in the first detection control sub-circuit 22. The third terminal 24*c* of the first voltage divider sub-circuit 24 is electrically connected to the first sensing line 211 in the first sensing sub-circuit 21. The first voltage divider sub-circuit 24 is configured to perform voltage-dividing processing on a voltage signal of the pull-up node Q<N> transmitted by the first detection control sub-circuit 22, so that the signal received by the first sensing sub-circuit 21 is within its sensing range, thereby ensuring accuracy of a detection result.

It will be noted that in a case where the first detection circuit 2 includes the first voltage divider sub-circuit 24, the associated voltage value of the voltage value of the pull-up node Q<N> detected by the first sensing sub-circuit 21 at the first moment is a voltage value of the third terminal 24*c* of the first voltage divider sub-circuit 24 at the first moment, and the associated voltage value of the voltage value of the pull-up node Q<N> detected by the first sensing sub-circuit 21 at the second moment is a voltage value of the third terminal 24*c* of the first voltage divider sub-circuit 24 at the second moment. Since the associated voltage value of the voltage value of the pull-up node Q<N> is positively correlated with the voltage value of the pull-up node Q<N>, a voltage difference at the pull-up node Q<N> detected by the first detection circuit 2 within the first interval time is the same as a voltage difference at the third terminal 24*c* of the first voltage divider sub-circuit 24 within the first interval time, that is, the voltage difference at the third terminal 24*c* of the first voltage divider sub-circuit 24 within the first interval time can reflect the voltage difference at the pull-up node Q<N> within the first interval time without affecting the measurement result and the compensation effect.

Figure 4:
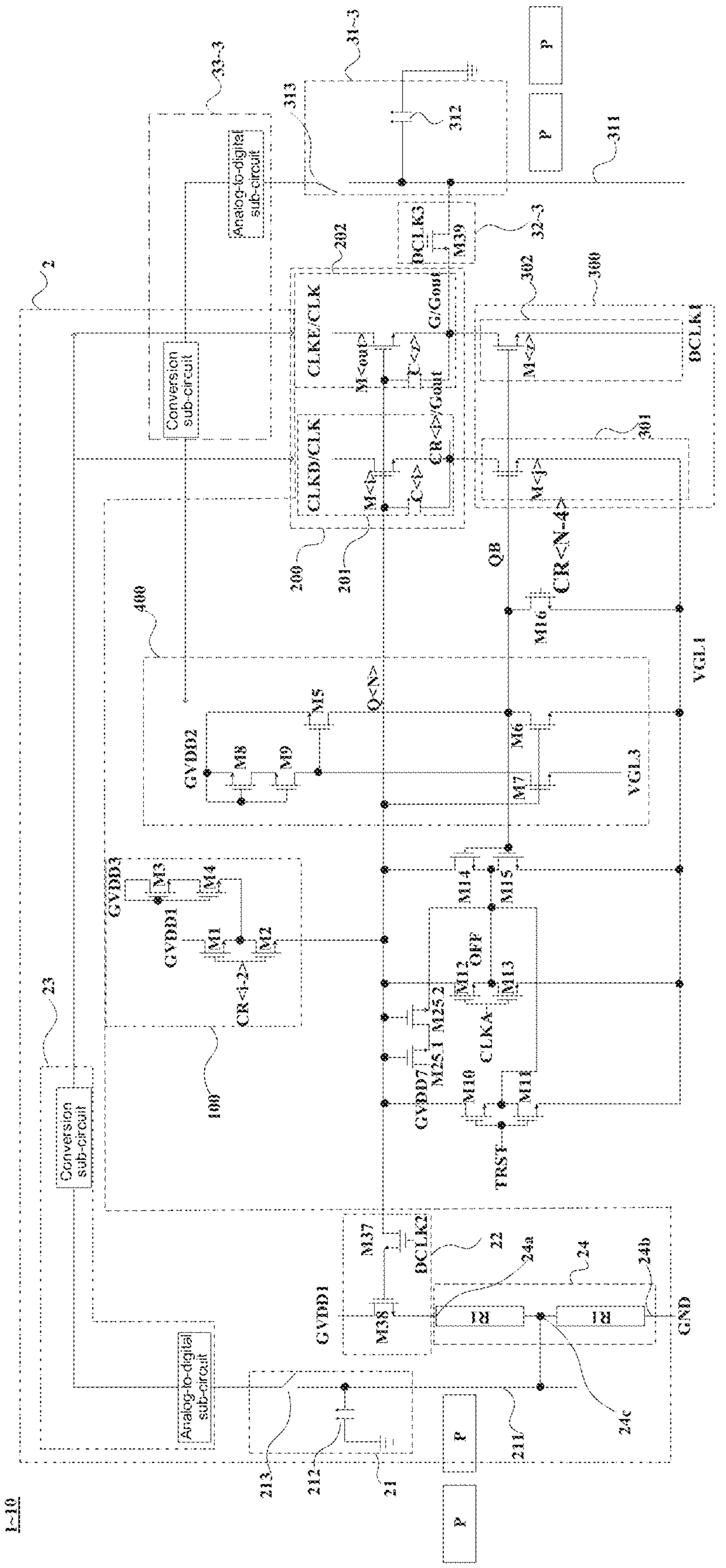
FIG. 4 is a circuit diagram of yet another shift register, in accordance with some embodiments of the present disclosure.

In some embodiments, as shown in FIG. 4, the shift register unit 1 further includes a pull-down sub-circuit 300 and a pull-down control sub-circuit 400. The pull-down sub-circuit 300 is electrically connected to a pull-down node QB, the output signal terminal Gout and a pull-down voltage terminal VGL. The pull-down sub-circuit 300 is configured to transmit the voltage at the pull-down voltage terminal VGL to the first signal output terminal OUTPUT1 under control of the pull-down node QB.

For example, in a case where a voltage at the pull-down node QB is a high voltage, the pull-down sub-circuit 300 can be turned on under control of the voltage at the pull-down node QB to receive a voltage at the pull-down voltage terminal VGL and transmit the voltage at the pull-down voltage terminal VGL to the output signal terminal Gout.

The pull-down control sub-circuit 400 is electrically connected to the pull-up node Q<N>, the pull-down node QB, a second power supply signal terminal GVDD2 and a third power supply signal terminal VGL1, and the pull-down control sub-circuit 400 is configured to control the voltage at the pull-down node QB under control of the pull-up node Q<N>, the second power supply signal terminal GVDD2 and the third power supply signal terminal VGL1.

The shift register 10 further includes a second detection circuit 3 which is electrically connected to the shift register unit 1. The second detection circuit 3 is electrically connected to the output signal terminal Gout and the second power supply signal terminal GVDD2. The second detection circuit 3 is configured to obtain a voltage difference at the output signal terminal Gout within a second interval time, and perform compensation on a voltage of a second power supply signal of the second power supply signal terminal GVDD2 based on the voltage difference at the output signal terminal Gout within the second interval time. The second interval time is an interval time between a third moment and a fourth moment, and the voltage difference at the output signal terminal Gout within the second interval time is within a second set range.

It will be noted that the second interval time is the same as the first interval time in the aforementioned content, and they are both interval times of the shift register unit 1 between an initial state and working for a period of time.

It will be noted that the above second set range is a range greater than −1 V and less than 0 V, or a range greater than 0 V and less than 1.5 V. If the voltage difference at the output signal terminal Gout within the second interval time is within the second set range, the second detection circuit can perform effective compensation on the voltage of the second power supply signal of the second power supply signal terminal GVDD2. If the voltage difference at the output signal terminal Gout within the second interval time is outside the second set range, the second detection circuit does not need to or cannot perform effective compensation on the voltage of the second power supply signal of the second power supply signal terminal GVDD2. For example, if the voltage difference at the output signal terminal Gout within the second interval time is 0, it means that the shift register does not have the problem of insufficient pull-down capability, and there is no need to perform compensation on the voltage of the second power supply signal of the second power supply signal terminal GVDD2; and if the voltage difference at the output signal terminal Gout within the second interval time is relatively large, it means that the positive drift phenomenon of the pull-down transistor is relatively serious, and the second detection circuit cannot perform effective compensation on the voltage of the second power supply signal of the second power supply signal terminal GVDD2.

For example, referring to FIG. 4, FIG. 4 shows the first detection circuit 2 and the second detection circuit 3. By providing the first detection circuit 2 and the second detection circuit 3, the voltage differences at the corresponding nodes within the first interval time and the second interval time may be quickly detected, and then the voltage of the clock signal of the clock signal terminal CLK and the voltage of the second power supply signal of the second power supply signal terminal GVDD2 may be compensated respectively through the voltage differences obtained by detection.

In some embodiments, the pull-down sub-circuit includes pull-down transistors. For example, as shown in FIG. 4, the pull-down sub-circuit includes a cascade pull-down transistor M<j> and a gating pull-down transistor M<z>. In a case where the pull-down transistors (a cascade pull-down transistor M<j> and a gating pull-down transistor M<z>) are turned on, the signal of the pull-down voltage terminal VGL is transmitted to the output signal terminal Gout. After the display device has been used for a long time, the pull-down transistor(s) will experience a serious positive drift phenomenon as the positive pressure goes on over time, which may cause the pull-down transistor(s) unable to be fully turned on under control of the voltage at the pull-down node QB, so that the signal of the pull-down voltage terminal VGL cannot be fully transmitted to the output signal terminal Gout, that is, the pull-down capability is insufficient, and the voltage at the output signal terminal Gout cannot reach a set voltage value, which also causes the output sub-circuit 200 to fail to reset normally. In addition, the pull-down control sub-circuit 400 cannot normally control the voltage at the pull-down node QB under control of the pull-up node Q<N>, the second power supply signal terminal GVDD2 and the third power supply signal terminal VGL1, so that the gate driver circuit fails.

The above provision of the first detection circuit 2 and the second detection circuit 3 can enable the output sub-circuit 200 to output the voltage after compensation of the clock signal of the clock signal terminal CLK, and moreover, the pull-down control sub-circuit 400 can input the voltage after compensation of the second power supply signal of the second power supply signal terminal GVDD2, thereby avoiding the problem that the output sub-circuit 200 cannot output normally due to insufficient input capacity of the input transistor(s) and the problem that the gate driver circuit fails due to serious positive drift of the pull-down transistor(s).

In some embodiments, referring to FIG. 4, the second detection circuit 3 includes a second sensing sub-circuit 31, a second detection control sub-circuit 32 and a second analog-to-digital conversion sub-circuit 33. The second detection control sub-circuit 32 is electrically connected to the second sensing sub-circuit 31, the output signal terminal Gout and a second detection control terminal DCLK3, and is configured to transmit the voltage at the output signal terminal Gout to the second sensing sub-circuit 31 under control of the second detection control terminal DCLK3. The second sensing sub-circuit 31 is configured to detect an associated voltage value of a voltage value of the output signal terminal Gout within a third moment and an associated voltage value of a voltage value of the output signal terminal Gout at the fourth moment. At the same moment, an associated voltage value of a voltage value of the output signal terminal Gout is positively correlated with the voltage value of the output signal terminal. The second analog-to-digital conversion sub-circuit 33 is electrically connected to the second sensing sub-circuit 31 and the second power supply signal terminal GVDD2, and is configured to obtain the voltage difference at the output signal terminal Gout within the second interval time based on the associated voltage value of the voltage value of the output signal terminal Gout at the third moment and the associated voltage value of the voltage value of the output signal terminal Gout at the fourth moment, generate a compensation voltage based on the voltage difference at the output signal terminal Gout within the second interval time, and transmit the compensation voltage to the second power supply signal terminal GVDD2.

It will be noted that the second analog-to-digital conversion sub-circuit 33 may include an analog-to-digital converter (ADC), and the second analog-to-digital conversion sub-circuit 33 can perform analog-to-digital conversion on the voltage value of the output signal terminal Gout to obtain the compensation voltage for subsequent compensation on the voltage at the second power supply signal terminal GVDD2.

In some embodiments, with continued reference to FIG. 4, the second sensing sub-circuit 31 includes a second sensing line 311, a second sensing capacitor 312 and a second switch 313. The second sensing line 311 is electrically connected to the second detection control sub-circuit 32, the second sensing line is electrically connected to a first electrode of the second sensing capacitor 312, a second electrode of the second sensing capacitor 312 is grounded, and the second switch 313 is electrically connected between the second sensing line 311 and the second analog-to-digital conversion sub-circuit 33.

For example, as shown in FIG. 4, the second switch 313 can achieve on and off of the second detection circuit 3. The second sensing line 311 electrically connected to the second detection control sub-circuit 32 can transmit the sensing signal to the second analog-to-digital conversion sub-circuit 33 through the on and off of the second switch 313. Through the conversion of the second analog-to-digital conversion sub-circuit 33, the second detection circuit 3 can detect the associated voltage value of the voltage value of the output signal terminal Gout at the third moment and the fourth moment, respectively.

In some embodiments, as shown in FIG. 4, the second detection control sub-circuit 32 includes a second detection control transistor M39. A gate of the second detection control transistor M39 is electrically connected to the second detection control terminal DCLK3, a first electrode of the second detection control transistor M39 is electrically connected to the output signal terminal Gout, and a second electrode of the second detection control transistor M39 is electrically connected to the second sensing sub-circuit 31.

For example, referring to FIG. 4, in a case where the second detection control transistor M39 is an N-type transistor, a working level of a second detection control signal transmitted by the second detection control terminal DCLK3 is a high level. In a case where the second detection control signal transmitted by the second detection control terminal DCLK3 is at a high level, the second detection control transistor M39 is turned on to transmit the voltage at the output signal terminal Gout to the second sensing sub-circuit 31.

Figure 5:
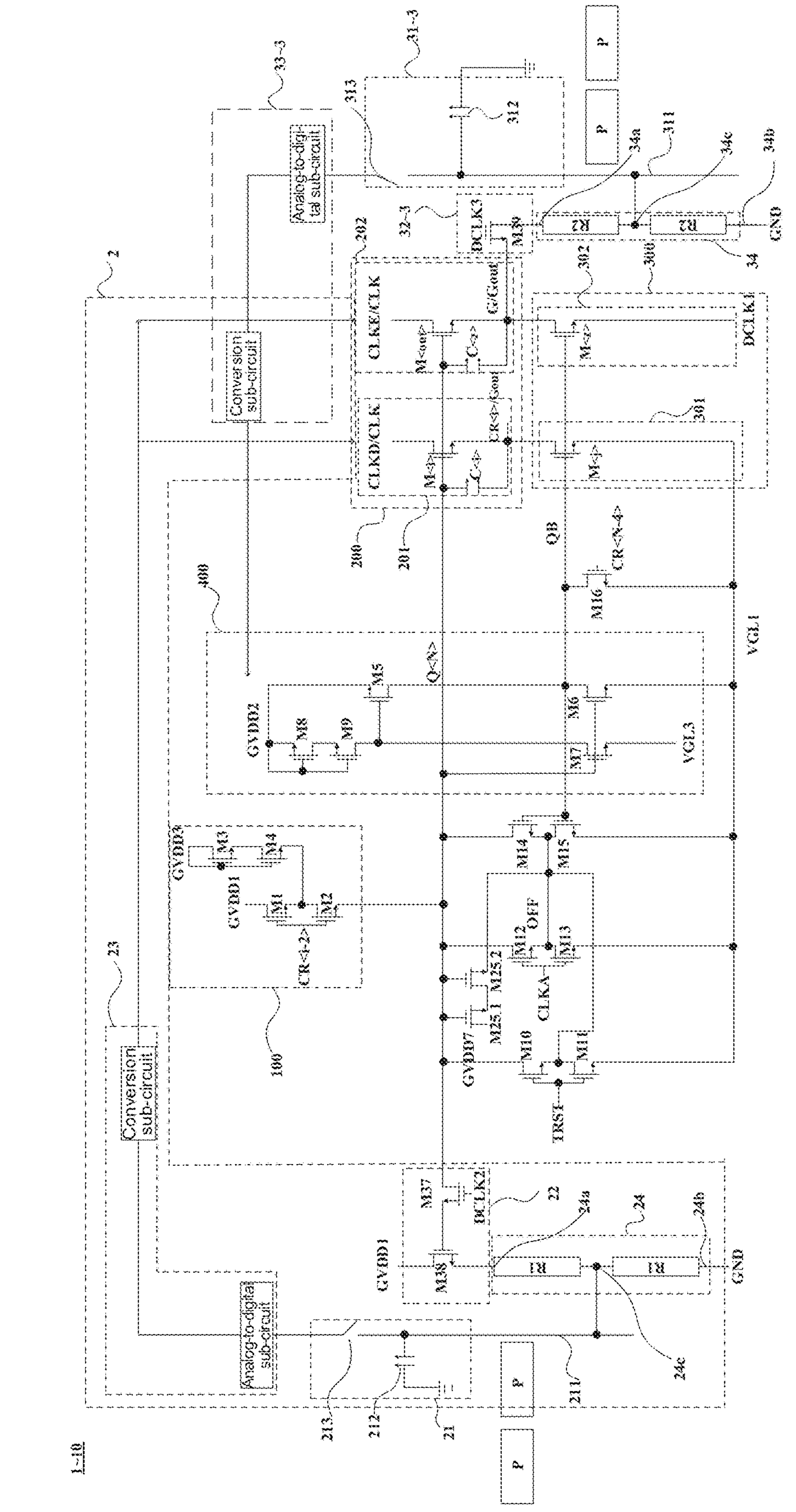
FIG. 5 is a circuit diagram of yet another shift register, in accordance with some embodiments of the present disclosure.

In some embodiments, as shown in FIG. 5, the second detection circuit 3 further includes a second voltage divider sub-circuit 34. The second voltage divider sub-circuit 34 includes at least two second-type voltage divider resistors R2 connected in series with each other. A first terminal 34*a* of the second voltage divider sub-circuit 34 is electrically connected to the second detection control sub-circuit 32, a second terminal 34*b* of the second voltage divider sub-circuit 34 is grounded, and a third terminal 34*c* of the second voltage divider sub-circuit 34 is electrically connected to the second sensing sub-circuit 31. The third terminal 34*c* of the second voltage divider sub-circuit 34 is a node at which two adjacent second-type voltage divider resistors R2 are electrically connected.

For example, referring to FIG. 5, the first terminal 34*a* of the second voltage divider sub-circuit 34 is electrically connected to the second detection control sub-circuit 32, e.g., the first terminal 34*a* of the second voltage divider sub-circuit 34 is electrically connected to the second electrode of the second detection control transistor M39 in the second detection control sub-circuit 32. The third terminal 34*c* of the second voltage divider sub-circuit 34 is electrically connected to the second sensing line 311 in the second sensing sub-circuit 31. The second voltage divider sub-circuit 34 is configured to perform voltage-dividing processing on a voltage signal of the output signal terminal Gout transmitted by the second detection control sub-circuit 32, so that the signal received by the second sensing sub-circuit 31 is within its sensing range, thereby ensuring accuracy of the detection result.

It will be noted that, in a case where the second detection circuit 3 includes the second voltage divider sub-circuit 34, the associated voltage value of the voltage value of the output signal terminal Gout detected by the second sensing sub-circuit 31 at the third moment is a voltage value of the third terminal 34*c* of the second voltage divider sub-circuit 34 at the third moment, and the associated voltage value of the voltage value of the output signal terminal Gout detected by the second sensing sub-circuit 31 at the fourth moment is a voltage value of the third terminal 34*c* of the second voltage divider sub-circuit 34 at the fourth moment. Since the associated voltage value of the voltage value of the output signal terminal Gout is positively correlated with the voltage value of the output signal terminal Gout, a voltage difference at the output signal terminal Gout detected by the second detection circuit 3 within the second interval time is the same as a voltage difference at the third terminal 34*c* of the second voltage divider sub-circuit 34 within the second interval time, that is, the voltage difference at the third terminal 34*c* of the second voltage divider sub-circuit 34 within the second interval time can reflect the voltage difference at the output signal terminal Gout within the second interval time without affecting the measurement result and the compensation effect.

Figure 6:
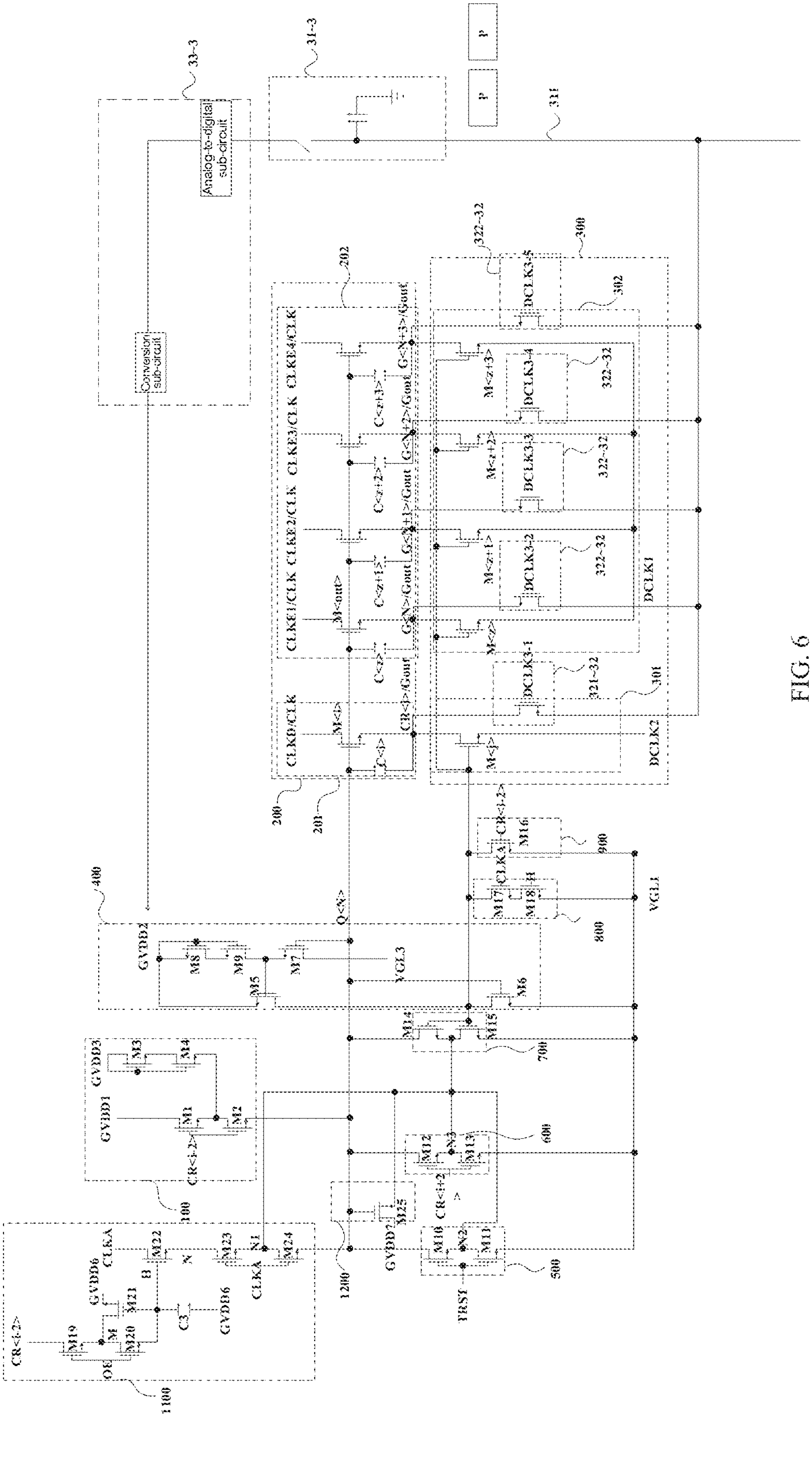
FIG. 6 is a circuit diagram of yet another shift register, in accordance with some embodiments of the present disclosure.

In some embodiments, referring to FIG. 6, the output sub-circuit 200 includes a cascade output sub-circuit 201 and at least one gating output sub-circuit 202, the clock signal terminal CLK includes a cascade clock signal terminal CLKD and at least one gating clock signal terminal CLKE, and the output signal terminal Gout includes a cascade output signal terminal CR<i> and at least one gating output signal terminal G. The cascade output sub-circuit 201 is electrically connected to the pull-up node Q<N>, the cascade clock signal terminal CLKD and the cascade output signal terminal CR<i>. The gating output sub-circuit 202 is electrically connected to the pull-up node Q<N>, the gating clock signal terminal CLKE and the gating output signal terminal G; and the gating output signal terminal G is electrically connected to the gate line. The pull-down sub-circuit 300 includes a cascade pull-down sub-circuit 301 and at least one gating pull-down sub-circuit 302. The pull-down voltage terminal VGL includes a first pull-down voltage terminal VGL1 (i.e., the third power supply signal terminal VGL1) and a second pull-down voltage terminal DCLK1. The cascade pull-down sub-circuit 301 is electrically connected to the cascade output signal terminal CR<i>, the pull-down node QB and the first pull-down voltage terminal VGL1. Each gating pull-down sub-circuit 302 is electrically connected to a gating output signal terminal G, the pull-down node QB and the second pull-down voltage terminal DCLK1.

For example, referring to FIG. 6, the output sub-circuit 200 includes a cascade output sub-circuit 201 and four gating output sub-circuits 202; the clock signal terminal CLK includes a cascade clock signal terminal CLKD and four gating clock signal terminals CLKE, and the four gating clock signal terminals CLKE are a first gating clock signal terminal CLKE1, a second gating clock signal terminal CLKE2, a third gating clock signal terminal CLKE3 and a fourth gating clock signal terminal CLKE4; and the output signal terminal Gout includes a cascade output signal terminal CR<i> and four gating output signal terminals G, and the four gating output signal terminals G are a first gating output signal terminal G<N>, a second gating output signal terminal G<N+1>, a third gating output signal terminal G<N+2> and a fourth gating output signal terminal G<N+3>.

In a case where a level transmitted by the pull-up node Q<N> is a working level, the cascade output sub-circuit 201 may be turned on under control of the voltage at the pull-up node Q<N> to receive a signal of the cascade clock signal terminal CLKD and transmit the signal of the cascade clock signal terminal CLKD to the cascade output signal terminal CR<i>, so that the cascade output signal terminal CR<i> outputs a cascade output signal. Similarly, in a case where the level transmitted by the pull-up node Q<N> is the working level, the gating output sub-circuits 202 may be turned on under control of the voltage at the pull-up node Q<N> to receive signals of the first gating clock signal terminal CLKE1, the second gating clock signal terminal CLKE2, the third gating clock signal terminal CLKE3 and the fourth gating clock signal terminal CLKE4 and transmit the signals of the first gating clock signal terminal CLKE1, the second gating clock signal terminal CLKE2, the third gating clock signal terminal CLKE3 and the fourth gating clock signal terminal CLKE4 respectively to the first gating output signal terminal G<N>, the second gating output signal terminal G<N+1>, the third gating output signal terminal G<N+2> and the fourth gating output signal terminal G<N+3>, so that the first gating output signal terminal G<N>, the second gating output signal terminal G<N+1>, the third gating output signal terminal G<N+2> and the fourth gating output signal terminal G<N+3> output gating output signals.

The pull-down sub-circuit 300 includes a cascade pull-down sub-circuit 301 and four gating pull-down sub-circuits 302; and the pull-down voltage terminal VGL includes the first pull-down voltage terminal VGL1 and the second pull-down voltage terminal DCLK1.

In a case where a level at the pull-down node QB is a working level, the cascade pull-down sub-circuit 301 may be turned on under control of the voltage at the pull-down node QB to receive a voltage at the first pull-down voltage terminal VGL1 and transmit the voltage at the first pull-down voltage terminal VGL1 to the cascade output signal terminal CR<i>. In a case where the level at the pull-down node QB is the working level, the gating pull-down sub-circuits 302 may be turned on under control of the voltage at the pull-down node QB to receive a voltage at the second pull-down voltage terminal DCLK1 and transmit the voltage at the second pull-down voltage terminal DCLK1 to the first gating output signal terminal the first gating output signal terminal G<N>, the second gating output signal terminal G<N+1>, the third gating output signal terminal G<N+2> and the fourth gating output signal terminal G<N+3>, respectively.

In some embodiments, with continued reference to FIG. 6, the second detection control sub-circuit 32 includes a cascade second detection control sub-circuit 321, the second detection control terminal DCLK3 includes a cascade second detection control terminal DCLK3-1, and the cascade second detection control sub-circuit 321 is electrically connected to the cascade output signal terminal CR<i> and the cascade second detection control terminal DCLK3-1.

For example, as shown in FIG. 6, the cascade second detection control sub-circuit 321 includes a cascade output signal terminal CR<i>. The cascade second detection control sub-circuit 321 is configured to transmit a voltage at the cascade output signal terminal CR<i> to the second sensing sub-circuit 31 under control of the cascade second detection control terminal DCLK3-1, so that the second sensing sub-circuit 31 detects the voltage value of the cascade output signal terminal CR<i> at the third moment and the voltage value of the cascade output signal terminal CR<i> at the fourth moment. The second detection circuit 3 may perform compensation on the voltage at the second power supply signal terminal GVDD2 based on the voltage difference.

In some embodiments, with continued reference to FIGS. 5 and 6, the second detection control sub-circuit 32 includes gating second detection control sub-circuit(s) 322, and the second detection control terminal DCLK3 includes gating second detection control terminal(s). The gating second detection control sub-circuit 322 is electrically connected to one of at least one gating output signal terminal G, and is electrically connected to a gating second detection control terminal.

For example, as shown in FIG. 5, there is one gating output signal terminal G provided, and the gating second detection control sub-circuit 322 is electrically connected to the gating output signal terminal G. The gating second detection control sub-circuit 322 transmits a voltage at the gating output signal terminal G to the second sensing sub-circuit 31 under control of the gating second detection control terminal, so that the second sensing sub-circuit 31 detects the voltage value of the gating output signal terminal G at the third moment and the voltage value of the gating output signal terminal G at the fourth moment. The second detection circuit 3 may perform compensation on the voltage at the second power supply signal terminal GVDD2 based on the voltage difference.

It will be noted that there may be a plurality of gating output signal terminals G provided, and the gating second detection control sub-circuit 322 is electrically connected to one of the plurality of gating output signal terminals G. That is, a gating output signal terminal G in the plurality of gating output signal terminals G may transmit the voltage at the gating output signal terminal G to the second sensing sub-circuit 31 under control of the gating second detection control terminal by being electrically connected to the gating second detection control sub-circuit 322.

In some embodiments, referring to FIG. 6, the output signal terminal Gout includes a plurality of gating output signal terminals G, the second detection control sub-circuit 32 includes a plurality of gating second detection control sub-circuits 322, and the second detection control terminal DCLK3 includes a plurality of gating second detection control terminals. Each gating second detection control sub-circuit 322 is electrically connected to a gating output signal terminal G, each gating second detection control sub-circuit 322 is electrically connected to a gating second detection control terminal, and the plurality of gating second detection control sub-circuits 322 are all electrically connected to the second sensing sub-circuit 31. The second detection circuit 3 is configured to obtain the voltage differences at the plurality of gating output signal terminals G within the second interval time, and perform compensation on the voltage of the second power supply signal terminal GVDD2 based on an average value of the voltage differences at the plurality of gating output signal terminals within the second interval time.

For example, as shown in FIG. 6, the output signal terminal Gout includes four gating output signal terminals G, and the four gating output signal terminals G are the first gating output signal terminal G<N>, the second gating output signal terminal G<N+1>, the third gating output signal terminal G<N+2> and the fourth gating output signal terminal G<N+3>. The second detection control terminal DCLK3 includes four gating second detection control terminals, and the four gating second detection control terminals are a first gating second detection control terminal DCLK3-2, a second gating second detection control terminal DCLK3-3, a third gating second detection control terminal DCLK3-4 and a fourth gating second detection control terminal DCLK3-5.

Each gating second detection control sub-circuit 322 is electrically connected to a gating second detection control terminal, that is, the four gating second detection control terminals are respectively electrically connected to the four gating second detection control sub-circuits 322. In addition, the four gating second detection control sub-circuits 322 are respectively electrically connected to the four gating output signal terminals G, and the four gating second detection control sub-circuits 322 are all electrically connected to the second sensing sub-circuit 31. It can be understood that the second sensing sub-circuit 31 is configured to detect the voltage values of the first gating output signal terminal G<N>, the second gating output signal terminal G<N+1>, the third gating output signal terminal G<N+2> and the fourth gating output signal terminal G<N+3> at the third moment and the fourth moment, and the second detection circuit 3 then obtains the voltage differences at the four gating output signal terminals G within the second interval time, and performs compensation on the voltage at the second power supply signal terminal GVDD2 based on an average value of the voltage differences at the four gating output signal terminals G within the second interval time.

In some embodiments, with continued reference to FIG. 6, in a case where the second detection control sub-circuit 32 further includes a cascade second detection control sub-circuit 321, the cascade second detection control sub-circuit 321 is electrically connected to the cascade output signal terminal CR<i>, the cascade second detection control terminal DCLK3-1, and the second sensing sub-circuit 31. The second detection circuit 3 is configured to obtain the voltage differences at the plurality of gating output signal terminals G within the second interval time and the voltage difference at the cascade output signal terminal CR<i> within the second interval time, and performs compensation on the voltage at the second power supply signal terminal GVDD2 based on an average value of the voltage differences at the plurality of gating output signal terminals G within the second interval time and the voltage difference at the cascade output signal terminal CR<i> within the second interval time.

For example, as shown in FIG. 6, the second detection control sub-circuit 32 includes a cascade second detection control sub-circuit 321 and four gating second detection control sub-circuits 322. The cascade second detection control sub-circuit 321 is configured to transmit the voltage at the cascade output signal terminal CR<i> to the second sensing sub-circuit 31 under control of the cascade second detection control terminal DCLK3-1, and the four gating second detection control sub-circuits 322 are configured to transmit the voltages at the four gating output signal terminals G to the second sensing sub-circuit 31 respectively under control of the four gating second detection control terminals. In this case, the second detection circuit 3 is equivalent to obtaining the voltage differences at the four gating output signal terminals G within the second interval time as well as the voltage difference at the cascade output signal terminal CR<i>, and then calculates an average value based on the above five voltage differences and further achieves compensation on the voltage at the second power supply signal terminal GVDD2.

By detecting the voltages at the cascade output signal terminal CR<i> and the four gating output signal terminals G, and then obtaining the average value of the voltage differences at the cascade output signal terminal CR<i> and the four gating output signal terminals G within the second interval time, the obtained compensation voltage may be made accurate, and the reliability of the gate driver circuit may further be ensured.

Figure 7:
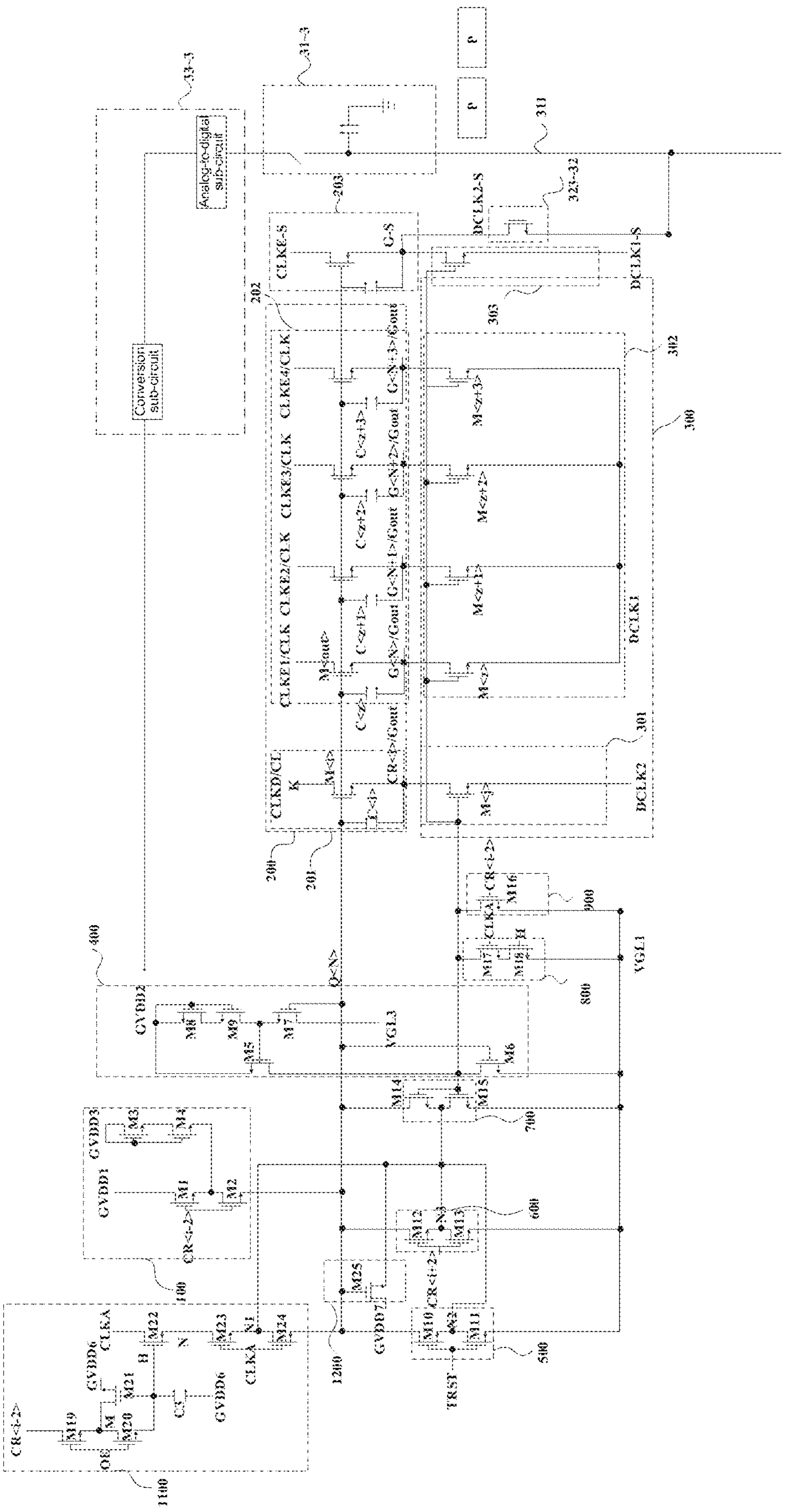
FIG. 7 is a circuit diagram of yet another shift register, in accordance with some embodiments of the present disclosure.

In some embodiments, referring to FIG. 7, the output sub-circuit 200 further includes a sensing output sub-circuit 203, the clock signal terminal CLK further includes a sensing clock signal terminal CLKE-S, and the output signal terminal Gout further includes a sensing output signal terminal G-S. The sensing output sub-circuit 203 is electrically connected to the pull-up node Q<N>, the sensing clock signal terminal CLKE-S and the sensing output signal terminal G-S.

The pull-down sub-circuit 300 further includes a sensing pull-down sub-circuit 303, the pull-down voltage terminal VGL further includes a third pull-down voltage terminal DCLK1-S, and the sensing pull-down sub-circuit 303 is electrically connected to the pull-down node QB, the sensing output signal terminal G-S and the third pull-down voltage terminal DCLK1-S.

The second detection control sub-circuit 32 further includes a sensing second detection control sub-circuit 323, and the second detection control terminal DCLK3 includes a sensing second detection control terminal DCLK2-S. The sensing second detection control sub-circuit 323 is electrically connected to the sensing second detection control terminal DCLK2-S, the sensing output signal terminal G-S and the second sensing sub-circuit 31.

The second detection circuit 3 is configured to obtain the voltage difference at the sensing output signal terminal G-S within the second interval time, and perform compensation on the voltage at the second power supply signal terminal GVDD2 based on the voltage difference at the sensing output signal terminal G-S within the second interval time.

For example, as shown in FIG. 7, in a case where a level transmitted by the pull-up node Q<N> is a working level, the sensing output sub-circuit 203 may be turned on under control of the voltage at the pull-up node Q<N> to receive a signal of the sensing clock signal terminal CLKE-S and transmit the signal of the sensing clock signal terminal CLKE-S to the sensing output signal terminal G-S, so that the sensing output signal terminal G-S outputs a sensing output signal. In a case where a level at the pull-down node QB is a working level, the sensing pull-down sub-circuit 303 may be turned on under control of the voltage at the pull-down node QB to receive a voltage at the third pull-down voltage terminal DCLK1-S and transmit the voltage at the third pull-down voltage terminal DCLK1-S to the sensing output signal terminal G-S. The sensing second detection control sub-circuit 323 is configured to transmit the voltage at the sensing output signal terminal G-S to the second sensing sub-circuit 31 under control of the sensing second detection control terminal DCLK2-S, so that the second sensing sub-circuit 31 detects the voltage difference at the sensing output signal terminal G-S within the second interval time. The second detection circuit 3 may perform compensation on the voltage at the second power supply signal terminal GVDD2 based on the voltage difference.

By providing the sensing output sub-circuit 203, the sensing output sub-circuit 203 is dedicated to detection of the associated voltage value of the pull-down node, and the cascade output sub-circuit and the gating output sub-circuit(s) do not participate in the detection. As a result, a function of the shift register unit normally outputting the gate drive signal will not be affected, thereby ensuring the normal work of the gate driver circuit.

Figure 8:
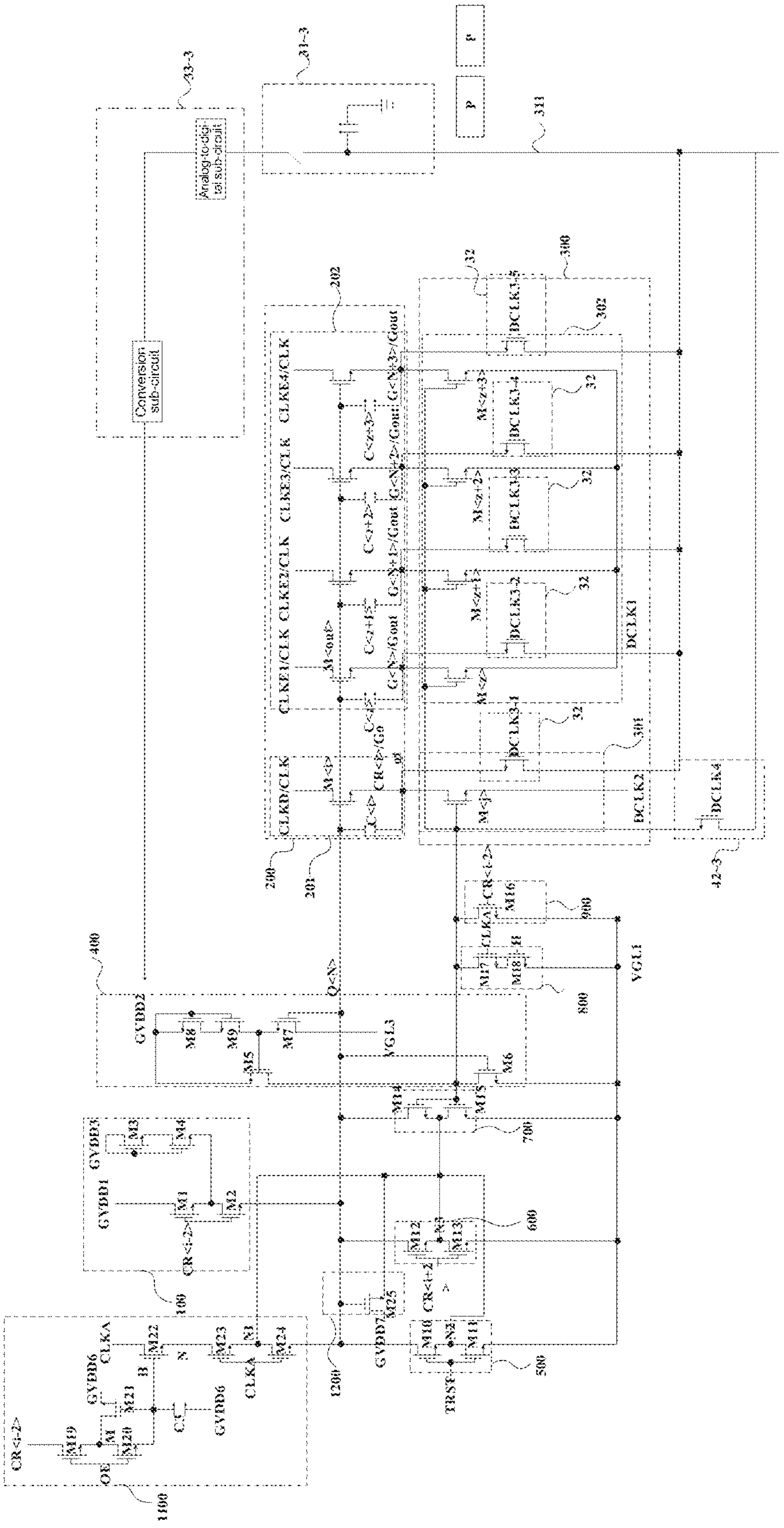
FIG. 8 is a circuit diagram of yet another shift register, in accordance with some embodiments of the present disclosure.

In some embodiments, referring to FIG. 8, the second detection circuit 3 is further electrically connected to the pull-down node QB. The second detection circuit 3 further includes a third detection control sub-circuit 42. The third detection control sub-circuit 42 is electrically connected to the pull-down node QB, the second sensing sub-circuit 31, and a third detection control terminal DCLK4, and the third detection control sub-circuit 42 is configured to, under control of the third detection control terminal DCLK4, transmit the voltage at the pull-down node QB to the second sensing sub-circuit 31. The second detection circuit 3 is configured to obtain the voltage difference at the pull-down node QB within the second interval time, and perform compensation on the voltage of the second power supply signal of the second power supply signal terminal GVDD2 based on the voltage difference at the pull-down node QB within the second interval time.

For example, as shown in FIG. 8, a control terminal of the third detection control sub-circuit 42 is connected to the third detection control terminal DCLK4, a first terminal of the third detection control sub-circuit 42 is electrically connected to the pull-down node QB, and a second terminal of the third detection control sub-circuit 42 is electrically connected to the second sensing sub-circuit 31. That is, the second sensing sub-circuit 31 can directly detect the voltage values of the pull-down node QB at the third moment and the fourth moment through the turn-on of the third detection control sub-circuit 42. The second detection circuit 3 can obtain the voltage difference at the pull-down node QB within the second interval time, and perform compensation on the voltage of the second power supply signal of the second power supply signal terminal GVDD2 in combination with the above voltage differences at various output signal terminals within the second interval time for comparison.

The specific structures of all the sub-circuits included in the shift register unit 1 will be described below.

In some embodiments, as shown in FIG. 6, the input sub-circuit 100 includes a first transistor M1, a second transistor M2, a third transistor M3 and a fourth transistor M4. A gate of the first transistor M1 and a gate of the second transistor M2 are electrically connected to the input control terminal CR<i−2>, a first electrode of the first transistor M1 is electrically connected to the input signal terminal GVDD1, a second electrode of the first transistor M1 is electrically connected to a first electrode of the second transistor M2, and a second electrode of the second transistor M2 is electrically connected to the pull-up node Q<N>. A gate and a first electrode of the third transistor M3 are electrically connected to a fourth power supply signal terminal GVDD3, a second electrode of the third transistor M3 is electrically connected to a first electrode of the fourth transistor M4, a gate of the fourth transistor M4 is electrically connected to the fourth power supply signal terminal GVDD3, and a second electrode of the fourth transistor M4 is electrically connected to the first electrode of the second transistor M2.

It will be noted that the third transistor M3 and the fourth transistor M4 are equivalent to forming an auxiliary input sub-circuit, which can further ensure that the output voltage of the first transistor M1 and second transistor M2 is a high voltage. The input sub-circuit 100 transmits the signal of the input signal terminal GVDD1 to the pull-up node Q<N> in response to an input control signal transmitted by the input control terminal CR<i−2>, so as to charge the pull-up node Q<N>, so that the voltage at the pull-up node Q<N> increases.

In some embodiments, as shown in FIG. 6, the output sub-circuit 200 includes a cascade output sub-circuit 201 and at least one gating output sub-circuit 202. The cascade output sub-circuit 201 includes a cascade output transistor M<i> and a cascade capacitor C<i>, and each gating output sub-circuit 202 includes a gating output transistor M<out> and a gating capacitor C<z>, C<z+1>, C<z+2> and C<z+3>.

A gate of the cascade output transistor M<i> is electrically connected to the pull-up node Q<N>, a first electrode of the cascade output transistor M<i> is electrically connected to the cascade clock signal terminal CLKD, and a second electrode of the cascade output transistor M<i> is electrically connected to the cascade output signal terminal CR<i>. Two terminals of the cascade capacitor C<i> are electrically connected to the pull-up node Q<N> and the cascade output signal terminal CR<i>.

A gate of the gating output transistor M<out> is electrically connected to the pull-up node Q<N>, a first electrode of the gating output transistor M<out> is electrically connected to the gating clock signal terminal CLKE, and a second electrode of the gating output transistor M<out> is electrically connected to the gating output signal terminal G. Two terminals of the gating capacitor C<z> are electrically connected to the pull-up node Q<N> and the gating output signal terminal G, respectively.

In a case where the shift register unit 1 further includes the pull-down sub-circuit 300, the pull-down sub-circuit 300 includes a cascade pull-down sub-circuit 301 and at least one gating pull-down sub-circuit 302. The cascade pull-down sub-circuit 301 includes a cascade pull-down transistor M<j>, and the gating pull-down sub-circuit 302 includes a gating pull-down transistor M<z>, M<z+1>, M<z+2> and M<z+3>.

A gate of the cascade pull-down transistor M<j> is electrically connected to the pull-down node QB, a first electrode of the cascade pull-down transistor M<j> is electrically connected to the first pull-down voltage terminal VGL1, and a second electrode of the cascade pull-down transistor M<j> is electrically connected to the cascade output signal terminal CR<i>. A gate of the gating pull-down transistor M<z> is electrically connected to the pull-down node QB, a first electrode of the gating pull-down transistor M<z> is electrically connected to the second pull-down voltage terminal DCLK1, and a second electrode of the gating pull-down transistor M<z> is electrically connected to the gating output signal terminal G.

For example, referring to FIG. 6, the output sub-circuit 200 includes a cascade output sub-circuit 201 and four gating output sub-circuits 202. In a case where a level transmitted by the pull-up node Q<N> is a working level, the cascade output sub-circuit 201 may be turned on under control of the voltage at the pull-up node Q<N> to receive the signal of the cascade clock signal terminal CLKD and transmit the signal of the cascade clock signal terminal CLKD to the cascade output signal terminal CR<i>, so that the cascade output signal terminal CR<i> outputs the cascade output signal of the current-stage shift register unit. Moreover, the gating output sub-circuits 202 may be turned on under control of the voltage at the pull-up node Q<N> to receive signals of the plurality of gating clock signal terminals CLKE and transmit the signals of the plurality of gating clock signal terminals CLKE to the first gating output signal terminal G<N>, the second gating output signal terminal G<N+1>, the third gating output signal terminal G<N+2> and the fourth gating output signal terminal G<N+3>, respectively, that is, output four gate drive signals.

In some embodiments, with continued reference to FIG. 6, the shift register unit 1 further includes a pull-down control sub-circuit 400, and the pull-down control sub-circuit 400 includes a fifth transistor M5, a sixth transistor M6, a seventh transistor M7, an eighth transistor M8 and a ninth transistor M9. A gate of the fifth transistor M5 is electrically connected to a second electrode of the ninth transistor M9, a first electrode of the fifth transistor M5 is electrically connected to the second power supply signal terminal GVDD2, and a second electrode of the fifth transistor M5 is electrically connected to a first electrode of the sixth transistor M6. Gates of the sixth transistor M6 and the seventh transistor M7 are electrically connected to the pull-up node Q<N>, a second electrode of the sixth transistor M6 is electrically connected to the third power supply signal terminal VGL1, a second electrode of the seventh transistor M7 is electrically connected to a fifth power supply signal terminal VGL3, and a first electrode of the seventh transistor M7 is electrically connected to the second electrode of the ninth transistor M9. A gate of the ninth transistor M9 is electrically connected to the second power supply signal terminal GVDD2, a first electrode of the ninth transistor M9 is electrically connected to a second electrode of the eighth transistor M8, and a gate and a first electrode of the eighth transistor M8 are electrically connected to the second power supply signal terminal GVDD2.

In some embodiments, with continued reference to FIG. 6, the shift register unit 1 further includes a reset sub-circuit 500, a pull-up node first noise reduction sub-circuit 600, a pull-up node second noise reduction sub-circuit 700, a pull-down node first noise reduction sub-circuit 800 and a pull-down node second noise reduction sub-circuit 900.

The reset sub-circuit 500 is electrically connected to a global reset control signal terminal TRST, the pull-up node Q<N> and the third power supply signal terminal VGL1. The reset sub-circuit 500 is configured to reset the pull-up node Q<N> under control of the global reset control signal terminal TRST and the third power supply signal terminal VGL1.

The pull-up node first noise reduction sub-circuit 600 is electrically connected to a first noise reduction control terminal CR<i+2>, the pull-up node Q<N> and the third power supply signal terminal VGL1. The pull-up node first noise reduction sub-circuit 600 is configured to reduce the noise of the pull-up node Q<N> under control of the first noise reduction control terminal CR<i+2> and the third power supply signal terminal VGL1. The pull-up node second noise reduction sub-circuit 700 is electrically connected to the pull-down node QB, the third power supply signal terminal VGL1 and the pull-up node Q<N>. The pull-up node second noise reduction sub-circuit 700 is configured to reduce the noise of the pull-up node Q<N> under control of the pull-down node QB and the third power supply signal terminal VGL1.

The pull-down node first noise reduction sub-circuit 800 is electrically connected to the input control terminal CR<i−2>, the pull-down node QB and the third power supply signal terminal VGL1. The pull-down node first noise reduction sub-circuit 800 is configured to reduce the noise of the pull-down node QB under control of the input control terminal CR<i−2> and the third power supply signal terminal VGL1. And/or, the pull-down node second noise reduction sub-circuit 900 is electrically connected to a blanking control clock signal terminal CLKA, a blanking control auxiliary signal terminal H, the pull-down node QB and the third power supply signal terminal VGL1. The pull-down node second noise reduction sub-circuit 900 is configured to reduce the noise of the pull-down node QB under control of the blanking control clock signal terminal CLKA, the blanking control auxiliary signal terminal H and the third power supply signal terminal VGL1.

For example, as shown in FIG. 6, the shift register unit 1 includes a pull-down node first noise reduction sub-circuit 800 and a pull-down node second noise reduction sub-circuit 900. The shift register unit 1 may achieve a noise reduction effect on the pull-down node QB through the two noise reduction sub-circuits. The shift register unit 1 shown in FIG. 6 is only an implementation. The shift register unit 1 may only include the pull-down node first noise reduction sub-circuit 800 or the pull-down node second noise reduction sub-circuit 900, which also has the noise reduction effect on the pull-down node QB.

In some embodiments, with continued reference to FIG. 6, the reset sub-circuit 500 includes a tenth transistor M10 and an eleventh transistor. Gates of the tenth transistor M10 and the eleventh transistor M11 are electrically connected to the global reset control signal terminal TRST, a first electrode of the tenth transistor M10 is electrically connected to a second electrode of the eleventh transistor M11, a first electrode of the eleventh transistor M11 is electrically connected to the third power supply signal terminal VGL1, and a second electrode of the tenth transistor M10 is electrically connected to the pull-up node Q<N>.

The pull-up node first noise reduction sub-circuit 600 includes a twelfth transistor M12 and a thirteenth transistor M13. Gates of the twelfth transistor M12 and the thirteenth transistor M13 are both electrically connected to the first noise reduction control terminal CR<i+2>, a first electrode of the twelfth transistor M12 is electrically connected to a second electrode of the thirteenth transistor M13, a first electrode of the thirteenth transistor M13 is electrically connected to the third power supply signal terminal VGL1, and a second electrode of the twelfth transistor M12 is electrically connected to the pull-up node Q<N>. The pull-up node second noise reduction sub-circuit 700 includes a fourteenth transistor M14 and a fifteenth transistor M15. Gates of the fourteenth transistor M14 and the fifteenth transistor M15 are electrically connected to the pull-down node QB, a first electrode of the fourteenth transistor M14 is electrically connected to a second electrode of the fifteenth transistor M15, a first electrode of the fifteenth transistor M15 is electrically connected to the third power supply signal terminal VGL1, and a second electrode of the fourteenth transistor M14 is electrically connected to the pull-up node Q<N>.

The pull-down node first noise reduction sub-circuit 800 includes a sixteenth transistor M16. A gate of the sixteenth transistor M16 is electrically connected to the input control terminal CR<i−2>, a first electrode of the sixteenth transistor M16 is electrically connected to the third power supply signal terminal VGL1, and a second electrode of the sixteenth transistor M16 is electrically connected to the pull-down node QB. The pull-down node second noise reduction sub-circuit 900 includes a seventeenth transistor M17 and an eighteenth transistor M18. A gate of the seventeenth transistor M17 is electrically connected to the blanking control clock signal terminal CLKA, a gate of the eighteenth transistor M18 is electrically connected to the blanking control auxiliary signal terminal H, a first electrode of the seventeenth transistor M17 is electrically connected to a second electrode of the eighteenth transistor M18, a first electrode of the eighteenth transistor M18 is electrically connected to the third power supply signal terminal VGL1, and a second electrode of the seventeenth transistor M17 is electrically connected to the pull-down node QB.

In some embodiments, as shown in FIG. 6, the shift register unit 1 further includes a blanking input sub-circuit 1100, and the blanking input sub-circuit 1100 is electrically connected to the input control terminal CR<i−2>, a blanking control signal terminal OE, the blanking control clock signal terminal CLKA, the blanking control auxiliary signal terminal H, a sixth power supply signal terminal GVDD6 and the pull-up node Q<N>. The blanking input sub-circuit 1100 is configured to achieve input of a blanking signal under control of the input control terminal CR<i−2>, the blanking control clock signal terminal CLKA and the blanking control signal terminal OE.

The blanking input sub-circuit 1100 includes a nineteenth transistor M19, a twentieth transistor M20, a twenty-first transistor M21, a twenty-second transistor M22, a twenty-third transistor M23, a twenty-fourth transistor M24 and a third capacitor C3. Gates of the nineteenth transistor M19 and the twentieth transistor M20 are electrically connected to the blanking control signal terminal OE, a first electrode of the nineteenth transistor M19 is electrically connected to the input control terminal CR<i−2>, and a second electrode of the nineteenth transistor M19 is electrically connected to a first electrode of the twentieth transistor M20.

A second electrode of the twentieth transistor M20 is electrically connected to a second electrode of the third capacitor C3, and a first electrode of the third capacitor C3 is electrically connected to the sixth power supply signal terminal GVDD6. A gate of the twenty-first transistor M21 is electrically connected to the second electrode of the third capacitor C3, a second electrode of the twenty-first transistor M21 is electrically connected to the second electrode of the nineteenth transistor M19, and a first electrode of the twenty-first transistor M21 is electrically connected to the sixth power supply signal terminal GVDD6. A gate of the twenty-second transistor M22 is electrically connected to the second electrode of the third capacitor C3, a first electrode of the twenty-second transistor M22 is electrically connected to the blanking control clock signal terminal CLKA, a second electrode of the twenty-second transistor M22 is electrically connected to a first electrode of the twenty-third transistor M23, a second electrode of the twenty-third transistor M23 is electrically connected to a first electrode of the twenty-fourth transistor M24, gates of the twenty-third transistor M23 and the twenty-fourth transistor M24 are electrically connected to the blanking control clock signal terminal CLKA, and a second electrode of the twenty-fourth transistor M24 is electrically connected to the pull-up node Q<N>.

In some embodiments, as shown in FIG. 6, the shift register unit 1 further includes a voltage stabilizing sub-circuit 1200, and the voltage stabilizing sub-circuit 1200 is electrically connected to a seventh power supply signal terminal GVDD7. The voltage stabilizing sub-circuit 1200 includes a twenty-fifth transistor M25. A gate of the twenty-fifth transistor M25 is electrically connected to the pull-up node Q<N>, a first electrode of the twenty-fifth transistor M25 is electrically connected to the seventh power supply signal terminal GVDD7, and a second electrode of the twenty-fifth transistor M25 is electrically connected to a first connection node N1, a second connection node N2 and a third connection node N3. The first connection node N1 is a connection node between the twenty-third transistor M23 and the twenty-fourth transistor M24, the second connection node N2 is a connection node between the tenth transistor M10 and the eleventh transistor M11, and the third connection node N3 is a connection node between the twelfth transistor M12 and the thirteenth transistor M13.

It will be noted that the voltage stabilizing sub-circuit 1200 is electrically connected to the pull-up node Q<N> and the seventh power supply signal terminal GVDD7, and is configured to transmit an electrical signal of the seventh power supply signal terminal GVDD7 to the first connection node N1, the second connection node N2 and the third connection node N3 under control of the pull-up node Q<N>, so as to ensure the stability of the voltage at the first connection node N1, the second connection node N2 and the third connection node N3, which has the function of preventing electric leakage.

Figure 9A:
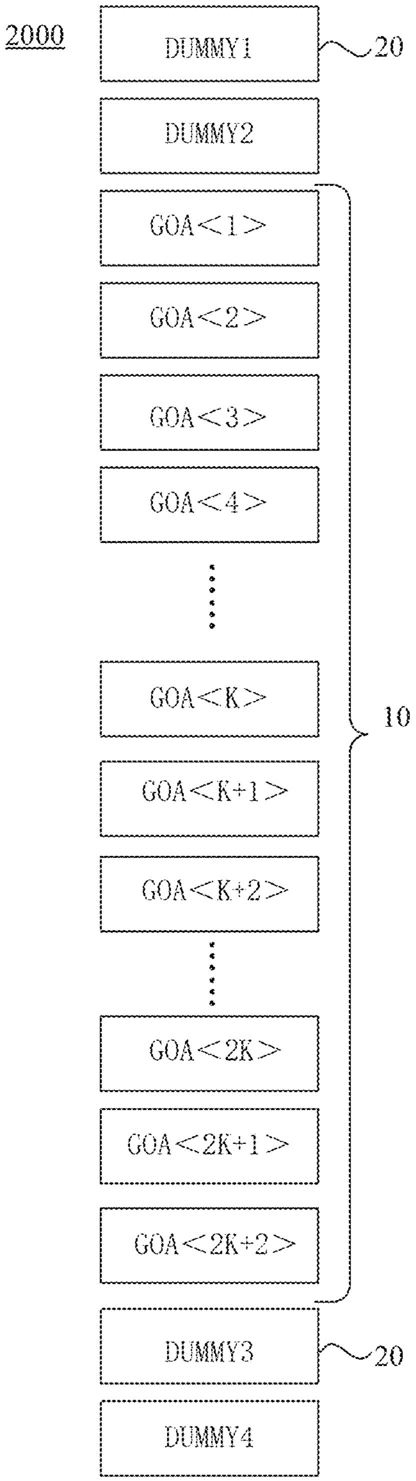
FIG. 9A is a structural diagram of a gate driver circuit, in accordance with some embodiments of the present disclosure.
Figure 9B:
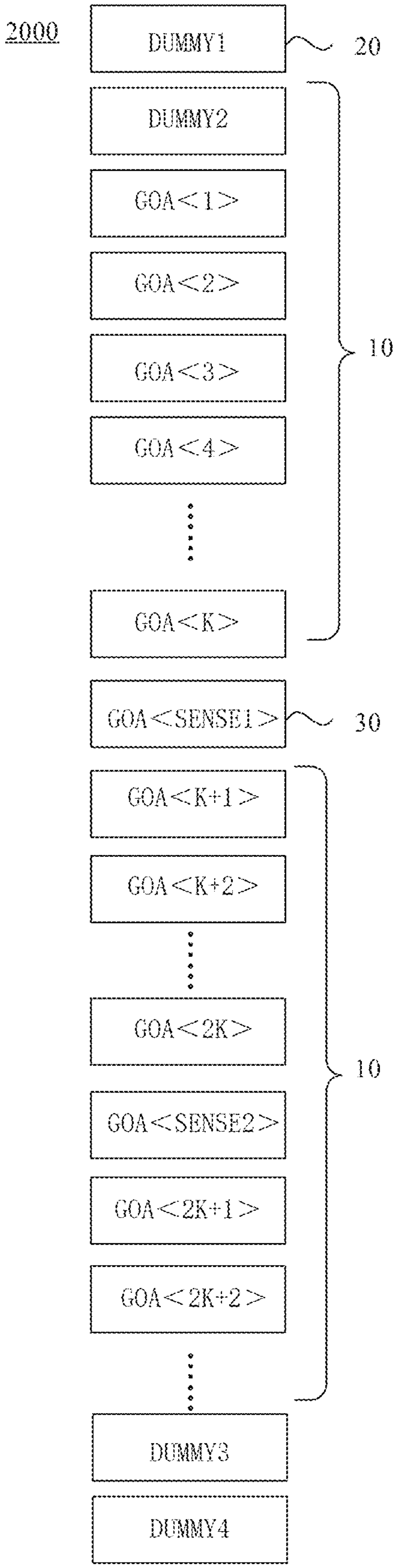
FIG. 9B is a structural diagram of another gate driver circuit, in accordance with some embodiments of the present disclosure.

Some embodiments of the present disclosure provide a gate driver circuit 2000. Referring to FIGS. 9A and 9B, the gate driver circuit 2000 includes N shift registers 10 that are cascaded. The shift register 10 includes a shift register unit 1. The shift register unit 1 is the shift register unit 1 in the shift register 10 provided in any of the above embodiments.

For example, in the N shift registers 10, shift register units each include a cascade output signal terminal and gating output signal terminal(s). A cascade output signal terminal of an i-th shift register unit is electrically connected to an input control terminal of an (i+n)-th shift register unit, and a cascade output signal terminal of the (i+n)-th shift register unit is electrically connected to a first noise reduction control terminal of the i-th shift register unit. The gating output terminal of each shift register unit is electrically connected to a gate line to output a scan signal to a display panel.

In some embodiments, referring to FIGS. 4, 9A and 9B, the gate driver circuit 2000 further includes dummy shift registers 20 and/or sensing shift registers 30. Dummy shift register(s) 20 are electrically connected to the first n-stage shift registers 10 in the N shift registers 10, or is electrically connected to the last m-stage shift registers 10 in the N shift registers 10. The dummy shift register 20 further includes a first detection circuit 2. Alternatively, the dummy shift register 20 further includes a first detection circuit 2 and a second detection circuit 3. Each K shift registers in the N shift registers constitute a group, and a sensing shift register 30 is located between two adjacent groups of shift registers 10. The cascade relationship of the sensing shift register 30 is the same as the cascade relationship of the k-th shift register 10 in a group of shift registers 10. The sensing shift register 30 further includes a first detection circuit 2, or the sensing shift register 30 further includes a first detection circuit 2 and a second detection circuit 3. The first detection circuit 2 is the first detection circuit 2 in the shift register 10 provided in any of the above embodiments, and the second detection circuit 3 is the second detection circuit 3 in the shift register 10 provided in any of the above embodiments.

It can be understood that the gate driver circuit 2000 may include dummy shift registers 20 and sensing shift registers 30. For example, referring to FIGS. 9A and 9B, dummy shift registers 20 may be provided at the beginning or the end of the N shift registers. Each K shift registers in the N shift registers constitute a group, and the sensing shift register 30 is provided between two adjacent groups of shift registers 10, and the dummy shift registers 20 and the sensing shift registers 30 each include the first detection circuit 2 and the second detection circuit 3, or include one of the first detection circuit 2 and the second detection circuit 3.

It will be noted that the cascade relationship of the sensing shift register 30 is the same as the cascade relationship of the k-th shift register 10 in a group of shift registers 10, which can be known according to the aforementioned contents and FIG. 6.

The N shift registers 10, and the dummy shift registers 20 and/or the sensing shift registers 30 are provided in the gate driver circuit. The cascade relationship of the gate driver circuit is achieved through the N shift registers 10 to achieve the normal output of the gate driver circuit, so as to control the display panel to display images. The dummy shift register 20 and/or the sensing shift register 30 are used as units under test, and the first detection circuit 2 and the second detection circuit 3 are used to respectively perform detection, so as to achieve compensation on the voltage of the clock signal of the clock signal terminal CLK and the voltage of the second power supply signal of the second power supply signal terminal GVDD2, thereby realizing the normal work of the gate driver circuit.

Figure 10:
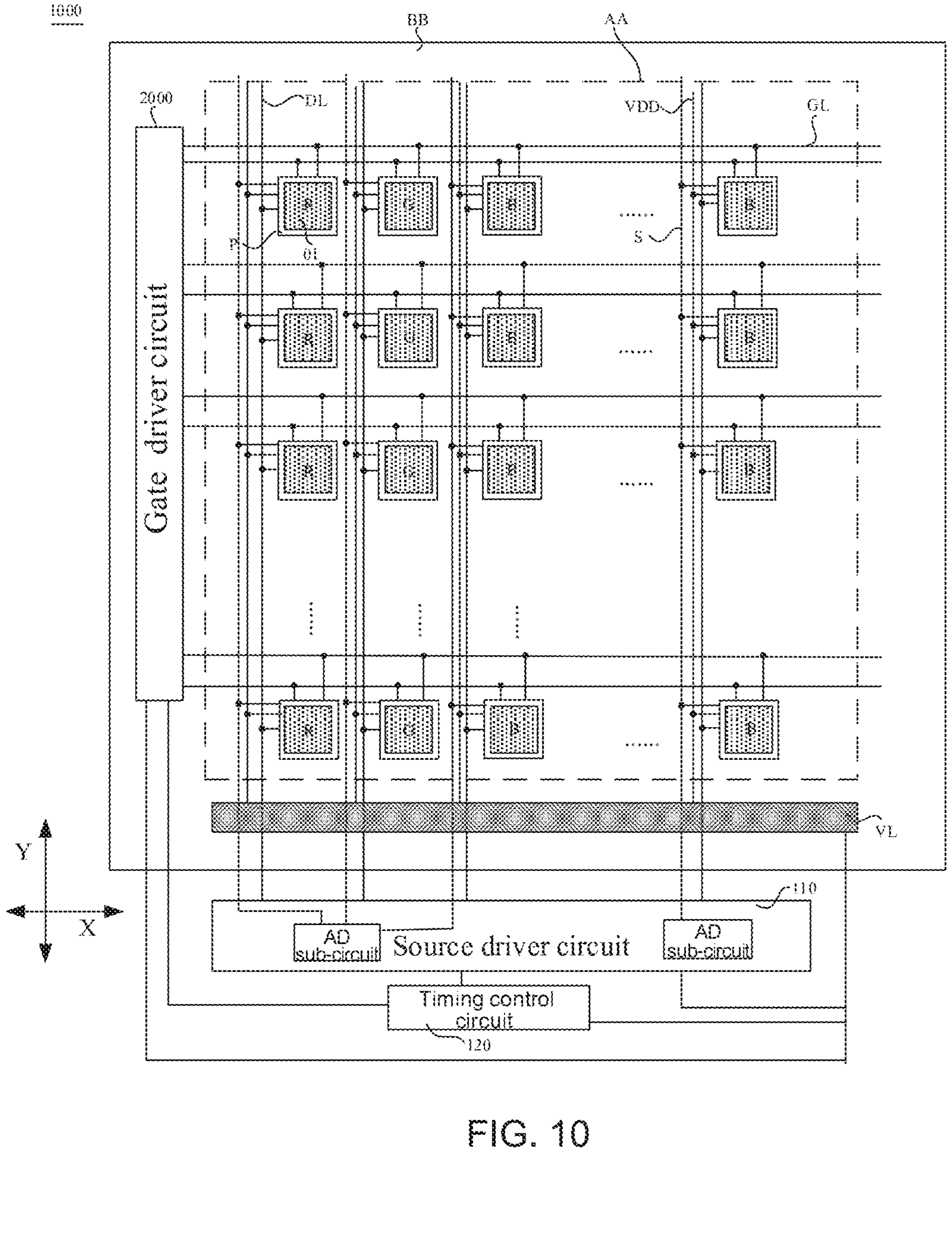
FIG. 10 is a structural diagram of a display device, in accordance with some embodiments of the present disclosure.

Some embodiments of the present disclosure provide a display device 1000, and the display device may be, for example, a mobile phone, a tablet computer, a personal digital assistant (PDA), an in-vehicle computer, a wearable display device, etc. The embodiments of the present disclosure do not particularly limit a specific form of the display device. As shown in FIG. 10, the display device 1000 includes the gate driver circuit 2000 as provided in the above embodiments. Therefore, the display device 1000 provided in the embodiments of the present disclosure has all the beneficial effects of the gate driver circuit 2000 provided by the above embodiments, and details are not repeated here.

In some embodiments, as shown in FIG. 10, the display device 1000 includes a display panel 001, a source driver circuit 110 (which may also be referred to as a data driver circuit and a source driver), a gate driver circuit 2000, and a timing control (TCON) circuit 120. The timing control circuit 120 is coupled to the source driver circuit 110 and the gate driver circuit 2000, the source driver circuit 110 is coupled to the display panel 001, and the gate driver circuit 2000 is coupled to the display panel 001 (the gate driver circuit may be provided in the display panel 001). The display panel 001 achieves display under control of the timing control circuit 120, the source driver circuit 110 and the gate driver circuit 2000.

For example, the source driver circuit 110 may be provided with a first detection circuit 2 and a second detection circuit 3 as described above.

In some embodiments, referring to FIGS. 4 and 10, the shift register 10 includes a first detection circuit 2 and a second detection circuit 3. The first detection circuit 2 includes a first sensing line 211, and the second detection circuit 3 includes a second sensing line 311. The display device 1000 further includes a plurality of sub-pixels P arranged in an array and sensing lines S. The sensing line S is located between the plurality of sub-pixels P and is electrically connected to a column of sub-pixels P. The sensing line S is also used as the first sensing line 211 and/or the second sensing line 311 in the shift register 10.

Figure 11:
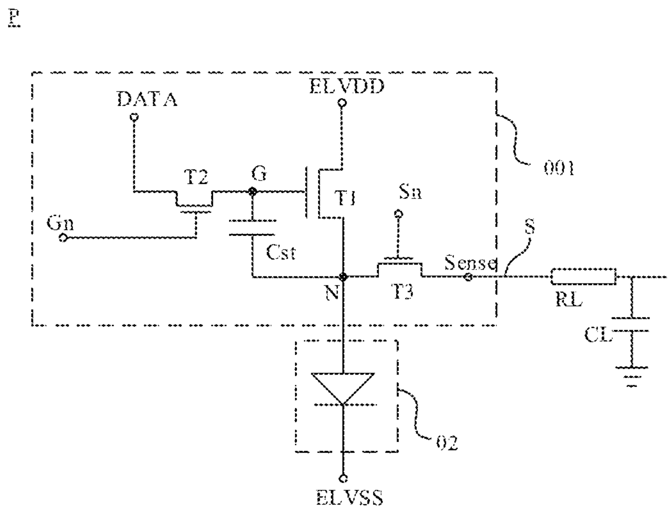
FIG. 11 is a structural diagram of a pixel driving circuit, in accordance with some embodiments of the present disclosure.

In some embodiments, a pixel driving circuit 01 of each sub-pixel P has the same structure. The structure of the pixel driving circuit 01 shown in FIG. 11 is introduced below. The pixel driving circuit 01 includes a driving transistor T1, a switching transistor T2 and a sensing transistor T3. A control electrode of the sensing transistor T3 is electrically connected to a gate signal terminal Sn, a first electrode of the sensing transistor T3 is electrically connected to a node N, a second electrode of the sensing transistor T3 is electrically connected to a sensing signal terminal Sense, and the sensing signal terminal Sense is electrically connected to a sensing line S. The sensing transistor T3 is configured to obtain a driving current generated by the driving transistor T1 in response to a gate signal received at the gate signal terminal Sn to detect electrical properties of the driving transistor T1, so as to realize external compensation. The electrical properties include, for example, a threshold voltage of the driving transistor T1 and/or a carrier mobility of the driving transistor T1.

In addition, the sensing signal terminal Sense may provide an initial signal or obtain a sensing signal. The initial signal is used to reset the node N, and the sensing signal is used to obtain the electrical properties of the driving transistor T1.

Referring to FIG. 10, the display panel 001 includes a plurality of sensing lines S disposed in a display area AA, and each sensing line S is electrically connected to a column of sub-pixels P. The sensing line S is configured to obtain a sensing signal the driving transistor in the sub-pixel P through the sensing transistor, and transmit the sensing signal to an external sensing circuit, so as to calculate a driving voltage value required for compensation using the external sensing circuit and perform feedback, thereby realizing external compensation for the sub-pixel P.

As shown in FIG. 4, the shift register 10 includes a first detection circuit 2 and a second detection circuit 3, the first detection circuit 2 includes a first sensing line 211, and the second detection circuit 3 includes a second sensing line 311. Based on the compensation effect of the above sensing line S, the above sensing line S located in the display area AA is also used as the first sensing line 211 or the second sensing line 311, so as to improve the utilization rate of the sensing line S in the display area AA.

In some embodiments, referring to FIG. 10, the display device 1000 further includes a display panel 001, which further includes a plurality of gate lines GL, a plurality of data lines DL, a power bus VL and a plurality of power supply voltage signal lines VDD. The plurality of power supply voltage signal lines VDD, the plurality of gate lines GL and the plurality of data lines DL are provided in the display area AA of the display panel 001, and the power bus VL is provided in a peripheral area BB of the display panel 001. The power bus VL is electrically connected to the plurality of power supply voltage signal lines VDD. Each power supply voltage signal line VDD is electrically connected to a column of sub-pixels P, pixel driving circuits 01 in the same row is coupled to the same gate line GL, and pixel driving circuits 01 in the same column is coupled to the same data line DL.

Some embodiments of the present disclosure provide compensation methods applied to the gate driver circuit 2000, which will be described in detail below.

In some embodiments, the compensation method of the gate driver circuit 2000 includes the following steps.

In S1, at a first moment, a first detection signal is received from the first detection circuit 2 of the gate driver circuit 2000 to obtain an associated voltage value V1 of a voltage value of the pull-up node Q<N> from the first detection signal.

In S2, at a second moment, a first detection signal is received from the first detection circuit 2 of the gate driver circuit 2000 to obtain an associated voltage value V2 of a voltage value of the pull-up node Q<N> from the first detection signal.

In S3, a voltage difference at the pull-up node Q<N> within a first interval time is obtained based on the associated voltage value V1 of the voltage value of the pull-up node Q<N> at the first moment and the associated voltage value V2 of the voltage value of the pull-up node Q<N> at the second moment, and compensation is performed on the voltage of the clock signal of the clock signal terminal CLK based on the voltage difference.

In some other embodiments, as shown in FIG. 11, the compensation method of the gate driver circuit 2000 includes the following steps.

In R1, at a third moment, a second detection signal is received from the second detection circuit 3 of the gate driver circuit 2000 to obtain an associated voltage value V3 of a voltage value of the output signal terminal Gout from the second detection signal.

In R2, at a fourth moment, a second detection signal is received from the second detection circuit 3 of the gate driver circuit 2000 to obtain an associated voltage value V4 of a voltage value of the output signal terminal Gout from the second detection signal.

In R3, a voltage difference at the output signal terminal Gout within a second interval time is obtained based on the associated voltage value V3 of the voltage value of the output signal terminal Gout at the third moment and the associated voltage value V4 of the voltage value of the output signal terminal Gout at the fourth moment, and compensation is performed on the voltage of the second power supply signal of the second power supply signal terminal GVDD2 based on the voltage difference.

In some other embodiments, as shown in FIG. 11, the compensation method of the gate driver circuit 2000 further includes the following steps.

In K1, the second detection circuit 2 includes a plurality of second detection control sub-circuits 32, and each second detection control sub-circuit 32 is electrically connected to an output signal terminal Gout.

In K2, the associated voltage value of the voltage value of the output signal terminal Gout electrically connected to each second detection control sub-circuit 32 at the third moment and the associated voltage value of the voltage value of the output signal terminal Gout electrically connected to each second detection control sub-circuit 32 at the fourth moment are calculated to obtain the voltage difference at the output signal terminal Gout within the second interval time.

In K3, an average value is calculated based on a plurality of voltage differences.

In K4, compensation is performed on the voltage of the second power supply signal of the second power supply signal terminal GVDD2 based on the average value.

For example, the second detection circuit 2 includes five second detection control sub-circuits 32, each second detection control sub-circuit 32 is electrically connected to an output signal terminal Gout, and for example, the associated voltage values of the voltage values of the output signal terminals Gout electrically connected to the five second detection control sub-circuits 32 at the third moment are V1_1, V1_2, V1_3, V1_4 and V1_5, and the associated voltage values of the voltage values of the output signal terminals Gout electrically connected to the five second detection control sub-circuits 32 at the fourth moment are V2_1, V2_2, V2_3, V2_4 and V2_5. Thus, a total voltage difference can be obtained as (V1_1+V1_2+V1_3+V1_4+V1_5−V2_1−V2_2−V2_3−V2_4−V2_5), and the average value is obtained through the total voltage difference, for example, by calculating (V1_1+V1_2+V1_3+V1_4+V1_5−V2_1−V2_2−V2_3−V2_4−V2_5)/5, and the average value obtained is a voltage value that needs to be compensated.

The compensation methods of the gate driver circuit 2000 may be combined in pairs, the compensation voltage adjusted by the above compensation methods can ensure the normal work of the gate driver circuit 2000, and the reliability of the gate driver circuit 2000 may be enhanced.

The foregoing descriptions are merely specific implementations of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. A shift register, comprising a shift register unit and a first detection circuit, wherein the shift register unit includes:

an input sub-circuit electrically connected to a pull-up node, an input control terminal and an input signal terminal; the input sub-circuit being configured to transmit a signal of the input signal terminal to the pull-up node under control of the input control terminal; and an output sub-circuit electrically connected to the pull-up node, a clock signal terminal and an output signal terminal; the output sub-circuit being configured to receive a clock signal from the clock signal terminal, and provide an output signal to the output signal terminal based on the received clock signal under control of a voltage at the pull-up node, so that the output signal terminal outputs a gate drive signal; and the first detection circuit is electrically connected to the shift register unit, and the first detection circuit is electrically connected to the pull-up node and the clock signal terminal; the first detection circuit is configured to obtain a voltage difference at the pull-up node within a first interval time, and perform compensation on a voltage of the clock signal from the clock signal terminal based on the voltage difference at the pull-up node within the first interval time; the first interval time is an interval time between a first moment and a second moment, and the voltage difference at the pull-up node within the first interval time is within a first set range.

2. The shift register according to claim 1, wherein the shift register unit further includes:

a pull-down sub-circuit electrically connected to a pull-down node, the output signal terminal and a pull-down voltage terminal; the pull-down sub-circuit being configured to transmit a voltage at the pull-down voltage terminal to the output signal terminal under control of a voltage at the pull-down node; and a pull-down control sub-circuit electrically connected to the pull-up node, the pull-down node, a second power supply signal terminal and a third power supply signal terminal; the pull-down control sub-circuit being configured to control the voltage at the pull-down node under control of the pull-up node, the second power supply signal terminal and the third power supply signal terminal; and the shift register further comprises:

a second detection circuit electrically connected to the shift register unit, wherein the second detection circuit is electrically connected to the output signal terminal and the second power supply signal terminal; and the second detection circuit is configured to obtain a voltage difference at the output signal terminal within a second interval time, and perform compensation on a voltage of a second power supply signal of the second power supply signal terminal based on the voltage difference at the output signal terminal within the second interval time; the second interval time is an interval time between a third moment and a fourth moment, and the voltage difference at the output signal terminal within the second interval time is within a second set range.

3. The shift register according to claim 2, wherein the second detection circuit includes a second sensing sub-circuit, a second detection control sub-circuit and a second analog-to-digital conversion sub-circuit;

the second detection control sub-circuit is electrically connected to the second sensing sub-circuit, the output signal terminal and a second detection control terminal, and is configured to transmit a voltage at the output signal terminal to the second sensing sub-circuit under control of the second detection control terminal;

the second sensing sub-circuit is configured to detect an associated voltage value of a voltage value of the output signal terminal at the third moment and an associated voltage value of a voltage value of the output signal terminal at the fourth moment; at a same moment, an associated voltage value of a voltage value of the output signal terminal is positively correlated with the voltage value of the output signal terminal; and the second analog-to-digital conversion sub-circuit is electrically connected to the second sensing sub-circuit and the second power supply signal terminal, and is configured to obtain the voltage difference at the output signal terminal within the second interval time based on the associated voltage value of the voltage value of the output signal terminal at the third moment and the associated voltage value of the voltage value at the fourth moment, generate a compensation voltage based on the voltage difference at the output signal terminal within the second interval time, and transmit the compensation voltage to the second power supply signal terminal.

4. The shift register according to claim 3, wherein the output sub-circuit includes a cascade output sub-circuit and at least one gating output sub-circuit, the clock signal terminal includes a cascade clock signal terminal and at least one gating clock signal terminal, and the output signal terminal includes a cascade output signal terminal and at least one gating output signal terminal, wherein the cascade output sub-circuit is electrically connected to the pull-up node, the cascade clock signal terminal and the cascade output signal terminal; and a gating output sub-circuit is electrically connected to the pull-up node, a gating clock signal terminal and a gating output signal terminal; the gating output signal terminal is configured to be electrically connected to a gate line; and the pull-down sub-circuit includes a cascade pull-down sub-circuit and at least one gating pull-down sub-circuit, and the pull-down voltage terminal includes a first pull-down voltage terminal and a second pull-down voltage terminal, wherein the cascade pull-down sub-circuit is electrically connected to the cascade output signal terminal, the pull-down node and the first pull-down voltage terminal; and each gating pull-down sub-circuit is electrically connected to a gating output signal terminal, the pull-down node and the second pull-down voltage terminal.

5. The shift register according to claim 4, wherein the output signal terminal includes a plurality of gating output signal terminals, the second detection control sub-circuit includes a plurality of gating second detection control sub-circuits, and the second detection control terminal includes a plurality of gating second detection control terminals;

each gating second detection control sub-circuit is electrically connected to a gating output signal terminal, each gating second detection control sub-circuit is electrically connected to a gating second detection control terminal, and the plurality of gating second detection control sub-circuits are all electrically connected to the second sensing sub-circuit; and the second detection circuit is configured to respectively obtain voltage differences at the plurality of gating output signal terminals within the second interval time, and perform compensation on the voltage of the second power supply signal of the second power supply signal terminal based on an average value of the voltage differences at the plurality of gating output signal terminals within the second interval time.

6. The shift register according to claim 5, wherein the second detection control sub-circuit further includes a cascade second detection control sub-circuit, and the cascade second detection control sub-circuit is electrically connected to the cascade output signal terminal, a cascade second detection control terminal and the second sensing sub-circuit; and the second detection circuit is configured to respectively obtain the voltage differences at the plurality of gating output signal terminals within the second interval time and a voltage difference at the cascade output signal terminal within the second interval time, and perform compensation on the voltage of the second power supply signal of the second power supply signal terminal based on an average value of the voltage differences at the plurality of gating output signal terminals within the second interval time and the voltage difference at the cascade output signal terminal within the second interval time.

7. The shift register according to claim 4, wherein the second detection control sub-circuit includes a cascade second detection control sub-circuit, and the second detection control terminal includes a cascade second detection control terminal; and the cascade second detection control sub-circuit is electrically connected to the cascade output signal terminal and the cascade second detection control terminal; or the second detection control sub-circuit includes at least one gating second detection control sub-circuit, and the second detection control terminal includes at least one gating second detection control terminal; and a gating second detection control sub-circuit is electrically connected to one of the at least one gating output signal terminal and electrically connected to a gating second detection control terminal.

8. The shift register according to claim 4, wherein the output sub-circuit further includes a sensing output sub-circuit, the clock signal terminal further includes a sensing clock signal terminal, the output signal terminal further includes a sensing output signal terminal, and the sensing output sub-circuit is electrically connected to the pull-up node, the sensing clock signal terminal and the sensing output signal terminal;

the pull-down sub-circuit further includes a sensing pull-down sub-circuit, the pull-down voltage terminal further includes a third pull-down voltage terminal, and the sensing pull-down sub-circuit is electrically connected to the pull-down node, the sensing output signal terminal, and the third pull-down voltage terminal;

the second detection control sub-circuit includes a sensing second detection control sub-circuit, and the second detection control terminal includes a sensing second detection control terminal; the sensing second detection control sub-circuit is electrically connected to the sensing second detection control terminal, the sensing output signal terminal, and the second sensing sub-circuit; and the second detection circuit is configured to obtain a voltage difference at the sensing output signal terminal within the second interval time, and perform compensation on the voltage of the second power supply signal of the second power supply signal terminal based on the voltage difference at the sensing output signal terminal within the second interval time.

9. The shift register according to claim 3, wherein the second sensing sub-circuit includes a second sensing line, a second sensing capacitor and a second switch; the second sensing line is electrically connected to the second detection control sub-circuit, the second sensing line is electrically connected to a first electrode of the second sensing capacitor, a second electrode of the second sensing capacitor is grounded, and the second switch is electrically connected between the second sensing line and the second analog-to-digital conversion sub-circuit; and/or the second detection control sub-circuit includes a second detection control transistor; a gate of the second detection control transistor is electrically connected to the second detection control terminal, a first electrode of the second detection control transistor is electrically connected to the output signal terminal, and a second electrode of the second detection control transistor is electrically connected to the second sensing sub-circuit; and/or the second detection circuit further includes a second voltage divider sub-circuit; and the second voltage divider sub-circuit includes at least two second-type voltage divider resistors connected in series; a first terminal of the second voltage divider sub-circuit is electrically connected to the second detection control sub-circuit, a second terminal of the second voltage divider sub-circuit is grounded, and a third terminal of the second voltage divider sub-circuit is electrically connected to the second sensing sub-circuit; and the third terminal of the second voltage divider sub-circuit is a node at which two adjacent second-type voltage divider resistors are electrically connected.

10. The shift register according to claim 3, wherein the second detection circuit is further electrically connected to the pull-down node;

the second detection circuit includes a third detection control sub-circuit;

the third detection control sub-circuit is electrically connected to the pull-down node, the second sensing sub-circuit and a third detection control terminal, and the third detection control sub-circuit is configured to transmit a voltage at the pull-down node to the second sensing sub-circuit under control of the third detection control terminal; and the second detection circuit is configured to obtain a voltage difference at the pull-down node within the second interval time, and perform compensation on the voltage of the second power supply signal of the second power supply signal terminal based on the voltage difference at the pull-down node within the second interval time.

11. The shift register according to claim 1, wherein the output sub-circuit includes a cascade output sub-circuit and at least one gating output sub-circuit; the cascade output sub-circuit includes a cascade output transistor and a cascade capacitor, and each gating output sub-circuit includes a gating output transistor and a gating capacitor;

a gate of the cascade output transistor is electrically connected to the pull-up node, a first electrode of the cascade output transistor is electrically connected to a cascade clock signal terminal, and a second electrode of the cascade output transistor is electrically connected to a cascade output signal terminal; two terminals of the cascade capacitor are electrically connected to the pull-up node and the cascade output signal terminal;

a gate of the gating output transistor is electrically connected to the pull-up node, a first electrode of the gating output transistor is electrically connected to a gating clock signal terminal, and a second electrode of the gating output transistor is electrically connected to a gating output signal terminal;

the shift register unit further includes a pull-down sub-circuit electrically connected to a pull-down node, the output signal terminal and a pull-down voltage terminal, the pull-down sub-circuit includes a cascade pull-down sub-circuit and at least one gating pull-down sub-circuit, the cascade pull-down sub-circuit includes a cascade pull-down transistor, and a gating pull-down sub-circuit includes a gating pull-down transistor;

a gate of the cascade pull-down transistor is electrically connected to the pull-down node, a first electrode of the cascade pull-down transistor is electrically connected to a first pull-down voltage terminal, and a second electrode of the cascade pull-down transistor is electrically connected to the cascade output signal terminal; a gate of the gating pull-down transistor is electrically connected to the pull-down node, a first electrode of the gating pull-down transistor is electrically connected to a second pull-down voltage terminal, and a second electrode of the gating pull-down transistor is electrically connected to the gating output signal terminal.

12. The shift register according to claim 11, wherein the shift register unit further includes a pull-down control sub-circuit, and the pull-down control sub-circuit includes a third transistor, a sixth transistor, a seventh transistor, an eighth transistor and a ninth transistor;

a gate of the fifth transistor is electrically connected to a second electrode of the ninth transistor, a first electrode of the fifth transistor is electrically connected to a second power supply signal terminal, and a second electrode of the fifth transistor is electrically connected to a first electrode of the sixth transistor;

gates of the sixth transistor and the seventh transistor are electrically connected to the pull-down node, a second electrode of the sixth transistor is electrically connected to a third power supply signal terminal, a second electrode of the seventh transistor is electrically connected to a fifth power supply signal terminal, and a first electrode of the seventh transistor is electrically connected to a second electrode of the ninth transistor; and a gate of the ninth transistor is electrically connected to the second power supply signal terminal, a first electrode of the ninth transistor is electrically connected to a second electrode of the eighth transistor, and a gate and a first electrode of the eighth transistor are electrically connected to the second power supply signal terminal.

13. The shift register according to claim 12, wherein the shift register unit further includes:

a reset sub-circuit, wherein the reset sub-circuit is electrically connected to a global reset control signal terminal, the pull-up node and the third power supply signal terminal; and the reset sub-circuit is configured to reset the pull-up node under control of the global reset control signal terminal and the third power supply signal terminal;

a pull-up node first noise reduction sub-circuit, wherein the pull-up node first noise reduction sub-circuit is electrically connected to a first noise reduction control terminal, the pull-up node and the third power supply signal terminal; and the pull-up node first noise reduction sub-circuit is configured to reduce noise of the pull-up node under control of the first noise reduction control terminal and the third power supply signal terminal;

a pull-up node second noise reduction sub-circuit, wherein the pull-up node second noise reduction sub-circuit is electrically connected to the pull-down node, the third power supply signal terminal and the pull-up node; and the pull-up node second noise reduction sub-circuit is configured to reduce noise of the pull-up node under control of the pull-down node and the third power supply signal terminal;

a pull-down node first noise reduction sub-circuit, wherein the pull-down node first noise reduction sub-circuit is electrically connected to the input control terminal, the pull-down node and the third power supply signal terminal; and the pull-down node first noise reduction sub-circuit is configured to reduce noise of the pull-down node under control of the input control terminal and the third power supply signal terminal; and/or a pull-down node second noise reduction sub-circuit, wherein the pull-down node second noise reduction sub-circuit is electrically connected to a blanking control clock signal terminal, a blanking control auxiliary signal terminal, the pull-down node and the third power supply signal terminal; and the pull-down node second noise reduction sub-circuit is configured to reduce noise of the pull-down node under control of the blanking control clock signal terminal, the blanking control auxiliary signal terminal and the third power supply signal terminal.

14. The shift register according to claim 13, wherein the shift register unit further includes a blanking input sub-circuit; the blanking input sub-circuit is electrically connected to the input control terminal, a blanking control signal terminal, the blanking control clock signal terminal, the blanking control auxiliary signal terminal, a sixth power supply signal terminal and the pull-up node; and the blanking input sub-circuit is configured to input a blanking signal under control of the input control terminal, the blanking control clock signal terminal and the blanking control signal terminal; wherein the blanking input sub-circuit includes a nineteenth transistor, a twentieth transistor, a twenty-first transistor, a twenty-second transistor, a twenty-third transistor, a twenty-fourth transistor and a third capacitor; gates of the nineteenth transistor and the twenty-third transistor are electrically connected to the blanking control signal terminal, a first electrode of the nineteenth transistor is electrically connected to the input control terminal, and a second electrode of the nineteenth transistor is electrically connected to a first electrode of the twentieth transistor;

a second electrode of the twentieth transistor is electrically connected to a second electrode of the third capacitor, a first electrode of the third capacitor is electrically connected to the sixth power supply signal terminal, a gate of the twenty-first transistor is electrically connected to the second electrode of the third capacitor, a second electrode of the twenty-first transistor is electrically connected to the second electrode of the nineteenth transistor, a first electrode of the twenty-first transistor is electrically connected to the sixth power supply signal terminal, a gate of the twenty-second transistor is electrically connected to the second electrode of the third capacitor, a first electrode of the twenty-second transistor is electrically connected to the blanking control clock signal terminal, a second electrode of the twenty-second transistor is electrically connected to a first electrode of the twenty-third transistor, a second electrode of the twenty-third transistor is electrically connected to a first electrode of the twenty-fourth transistor, gates of the twenty-third transistor and the twenty-fourth transistor are electrically connected to the blanking control clock signal terminal, and a second electrode of the twenty-fourth transistor is electrically connected to the pull-up node; or the shift register unit further includes a voltage stabilization sub-circuit, and the voltage stabilization sub-circuit is electrically connected to the pull-up node and a seventh power supply signal terminal; the voltage stabilization sub-circuit includes a twenty-fifth transistor; a gate of the twenty-fifth transistor is electrically connected to the pull-up node, a first electrode of the twenty-fifth transistor is electrically connected to the seventh power supply signal terminal, and a second electrode of the twenty-fifth transistor is electrically connected to a first connection node, a second connection node and a third connection node.

15. The shift register according to claim 1, wherein the first detection circuit includes a first sensing sub-circuit, a first detection control sub-circuit and a first analog-to-digital conversion sub-circuit;

the first detection control sub-circuit is electrically connected to the first sensing sub-circuit, the pull-up node and a first detection control terminal, and is configured to output the voltage at the pull-up node to the first sensing sub-circuit under control of the first detection control terminal;

the first sensing sub-circuit is configured to detect an associated voltage value of a voltage value of the pull-up node at the first moment and an associated voltage value of a voltage value of the pull-up node at the second moment; at a same moment, an associated voltage value of a voltage value of the pull-up node is positively correlated with the voltage value of the pull-up node; and the first analog-to-digital conversion sub-circuit is electrically connected to the first sensing sub-circuit and the clock signal terminal, and is configured to obtain the voltage difference at the pull-up node within the first interval time based on the associated voltage value of the voltage value of the pull-up node at the first moment and the associated voltage value of the voltage value of the pull-up node at the second moment, generate a compensation voltage based on the voltage difference at the pull-up node within the first interval time, and transmit the compensation voltage to the clock signal terminal.

16. The shift register according to claim 15, wherein the first sensing sub-circuit includes a first sensing line, a first sensing capacitor and a first switch;

the first sensing line is electrically connected to the first detection control sub-circuit, the first sensing line is electrically connected to a first electrode of the first sensing capacitor, a second electrode of the first sensing capacitor is grounded, and the first switch is electrically connected between the first sensing line and the first analog-to-digital conversion sub-circuit.

17. The shift register according to claim 15, wherein the first detection control sub-circuit includes a first detection control transistor; a gate of the first detection control transistor is electrically connected to the first detection control terminal, a first electrode of the first detection control transistor is electrically connected to the pull-up node, and a second electrode of the first detection control transistor is electrically connected to the first sensing sub-circuit;

the first detection control sub-circuit includes a first detection control transistor and a reverse bias transistor; a gate of the first detection control transistor is electrically connected to the first detection control terminal, a first electrode of the first detection control transistor is electrically connected to the pull-up node, and a second electrode of the first detection control transistor is electrically connected to the first sensing sub-circuit; a gate of the reverse bias transistor is electrically connected to the second electrode of the first detection control transistor, a first electrode of the reverse bias transistor is electrically connected to a first power supply signal terminal, and a second electrode of the reverse bias transistor is electrically connected to the first sensing sub-circuit.

18. The shift register according to any of claim 15, wherein the first detection circuit further includes a first voltage divider sub-circuit, and the first voltage divider sub-circuit includes at least two first-type voltage divider resistors connected in series; and a first terminal of the first voltage divider sub-circuit is electrically connected to the first detection control sub-circuit, a second terminal of the first voltage divider sub-circuit is grounded, and a third terminal of the first voltage divider sub-circuit is electrically connected to the first sensing sub-circuit; and the third terminal of the first voltage divider sub-circuit is a node at which two adjacent first-type voltage divider resistors are electrically connected.

19. A gate driver circuit, comprising N shift registers that are cascaded, wherein the shift registers each includes a shift register unit, and the shift register unit is the shift register unit in the shift register according to claim 1; and the gate driver circuit further comprising dummy shift registers and/or sensing shift registers, wherein a dummy shift register is electrically connected to first n-stage shift registers in the N shift registers, or a dummy shift register is electrically connected to last m-stage shift registers in the N shift registers; the dummy shift register includes a first detection circuit, or the dummy shift register includes a first detection circuit and a second detection circuit;

Each K shift registers in the N shift registers constitute a group, and a sensing shift register is located between two adjacent groups of shift registers; a cascade relationship of the sensing shift register is same as a cascade relationship of a k-th shift register in a group of shift registers; the sensing shift register includes a first detection circuit, or the sensing shift register includes a first detection circuit and a second detection circuit;

the first detection circuits are each a first detection circuit in the shift register, and the second detection circuits are each a second detection circuit in the shift register.

20. A display device, comprising the gate driver circuit according to claim 19.

* * * * *